United States Patent [19]

Fennell et al.

[11] 4,427,980

[45] Jan. 24, 1984

[54] ENCODER FOR TRANSMITTED MESSAGE ACTIVATION CODE

[75] Inventors: Robert D. Fennell, Coral Springs; Allen J. Weidler, Ft. Lauderdale; David F. Bailey, Plantation, all of Fla.

[73] Assignee: Motorola, Inc., Schaumburg, Ill.

[21] Appl. No.: 310,591

[22] Filed: Oct. 13, 1981

[51] Int. Cl.³ .......................... H04Q 7/00; H04Q 9/00; H04M 11/02

[52] U.S. Cl. ........................... 340/825.52; 340/825.44; 340/825.47; 179/2 EC

[58] Field of Search ...................... 340/825.52, 825.47, 340/825.44, 311.1; 179/2 EC; 455/70, 54, 53, 49, 48

[56] References Cited

U.S. PATENT DOCUMENTS

| | | | |
|---|---|---|---|
| 3,944,724 | 3/1976 | Kilby et al. | 178/41 A |
| 4,121,052 | 10/1978 | Richard | 179/2 DP |
| 4,178,476 | 12/1979 | Frost | 340/825.44 |

Primary Examiner—Donald J. Yusko
Attorney, Agent, or Firm—Philip R. Wadsworth; Edward M. Roney; James W. Gillman

[57] ABSTRACT

The encoder which preferably produces a transmitted digital word which serves as an activation code for a single receiver or a group of receivers. The activation code effects only the receiver(s) that have previously detected their digital address and are therefore prepared to enter a message receive state. The activation code transmitted by the encoder will cue the receiver(s) simultaneously thereby allowing the encoder to send a single message to a plurality of receivers. The activation code also allows the encoder to interleave messages to receivers by utilizing the customary transmitter down time in a single message transmission. During this down time, the activation code allows the transmitter to begin transmission of a second message to a second receiver. The use of the activation code to interleave messages is especially important in tone and voice transmissions since it significantly increases the efficiency of a heavily loaded system.

21 Claims, 12 Drawing Figures

FIG. 1

ENCODER FOR TRANSMITTED MESSAGE ACTIVATION CODE

BACKGROUND OF THE INVENTION

Prior art message systems generally function upon the detection of coded signals which are predesignated to correspond to an address of an individual receiver. Some prior art digital coding systems operate by having a plurality of receivers asynchronously come on a timed basis to look for the presence of a digital word to determine if they should remain on for the detection of a possible message. This constitutes a form of battery saving to the receiver population.

A limitation of such prior art systems is that there is not a convenient method of arranging group calls at the transmitter site or paging terminal so that an arbitrary plurality of pagers may be activated simultaneously. A further limitation with the prior art occurs for tone and voice systems in which the paging receiver provides an alert time after which a voice message may be detected. Each time an individual paging receiver is paged with a voice message the alert time interval during which the pager user is warned so that he may respond to the subsequent audio message is lost to the system since no other information can be transmitted during that interval. If for example, another tone and voice pager were addressed during the alert time for the first addressed tone and voice pager at the conclusion of the second addressed tone and voice pagers alert time its audio channel would be enabled to catch a substantial portion of the voice message for the first addressed tone and voice pager thereby possibly confusing the pager users with respect to the messages they receive.

One aspect of the present invention includes the positioning of an activation code signal within a broadcast message system such that all receivers which have been correctly addressed remain in a ready state until the detection of an activate code signal which then causes simultaneous activation of the operational routine. Although the specific invention is embodied within a digital paging system it is clear to those skilled in the art that it may have many other uses and formats. Morever the use of such an activation control signal enables the interleaving of messages within a message alert time especially for a tone and voice pager which has been addressed and ensures that the second addressed tone and voice pager will not activate until it receives an activation code signal subsequent to its address. Thus there is no chance that the second address tone and voice pager could come on during the time period in which the first pager was receiving its variable length voice message. Another advantage of such a system is that it further allows interleaving of various types of messages including tone only, data and tone and voice into one signalling system thereby substantially enhancing the flexibility of the transmitted message system.

SUMMARY OF THE INVENTION

It is an object of the present invention to provide an improved encoder for transmitted coded messages.

It is a further object of this invention to provide an encoder which can designate the activation time of addressed receivers.

An encoding device for generating sequential code signals containing information which is to be transmitted by means of electromagnetic radiation to selected receivers in a plural population of receivers comprises means for generating coded signals to address at least one receiver, in the plural population and means for generating activation code signals subsequent to the address signals to cause at least one addressed receiver to respond to the information transmitted.

BRIEF DESCRIPTION OF THE DRAWINGS

FIG. 1 A–G are timing diagrams for the encoded message system for the present invention.

DESCRIPTION OF THE PREFERRED EMBODIMENT

Figure 1:
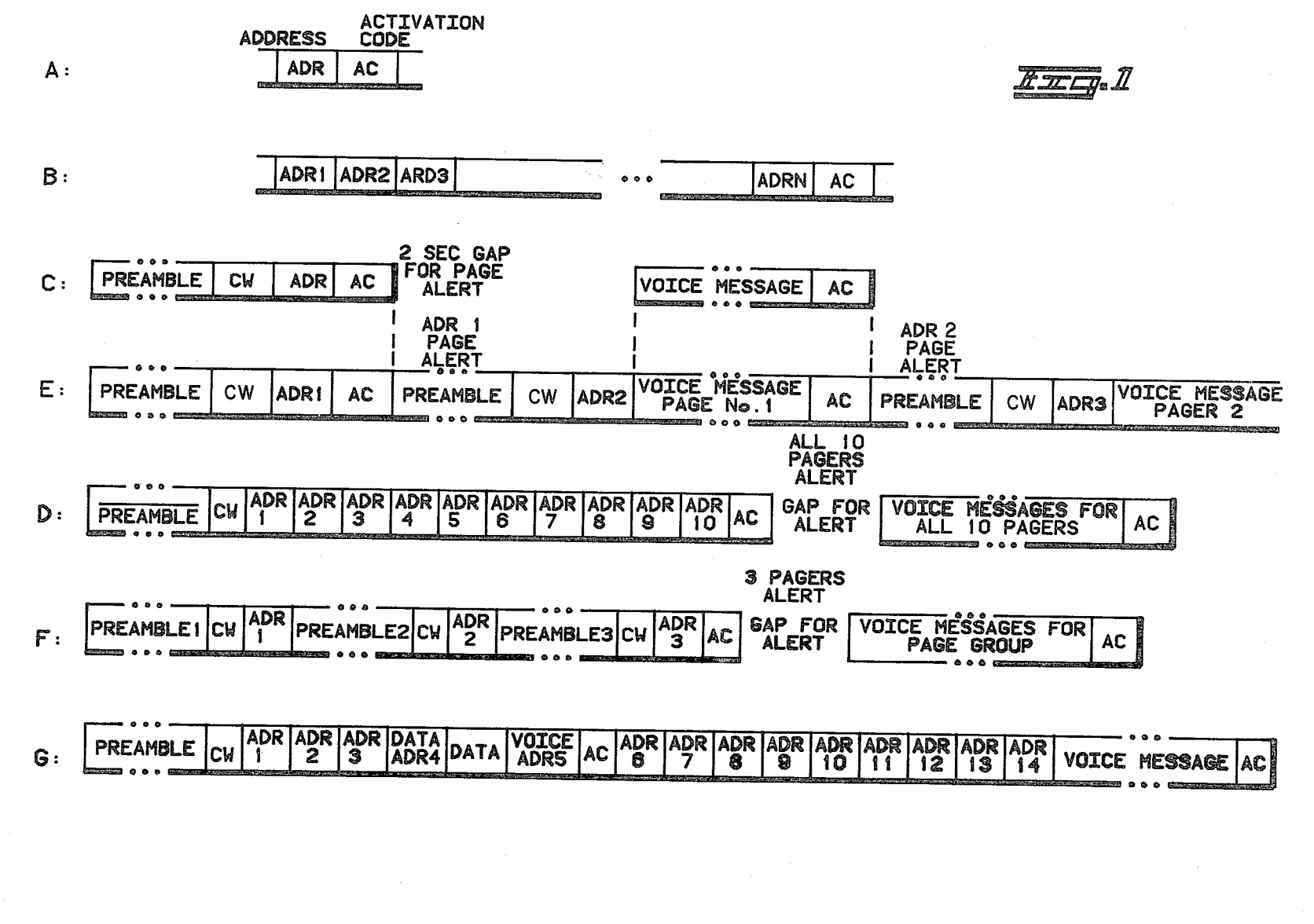
Figure 2:
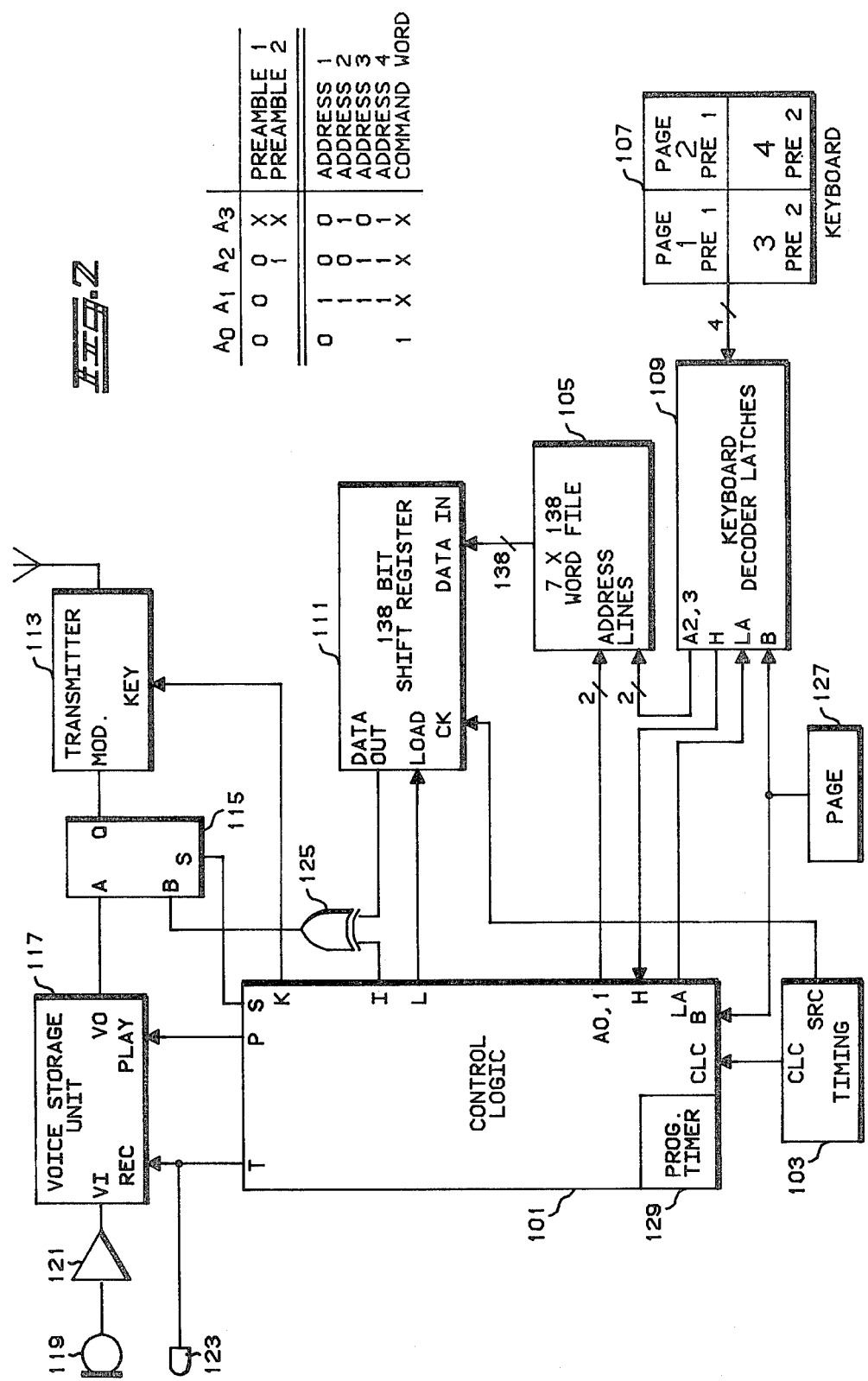
FIG. 2 is a functional block diagram of a hardware embodiment of the present invention.

FIG. 1A show is a timing diagram illustrating the use of the activation code signal in connection with addressing a receiver. Normally receivers detect their address and immediately respond by whatever function corresponds to the predetermined address which has been detected. While this is common in the prior art, it is distinctly advantageous to provide an additional activation code signal which controls the time at which the receiver will respond to the detection of its address. Thus the inclusion of the activation control signal allows the transmitter to determine precisely when any addressed receiver will become active.

As may be more clearly seen by referring to FIG. 1B a plurality of receivers may be grouped by including a series of addresses in sequential fashion followed by an activation code signal at the conclusion of whatever arbitrary number of addresses may be chosen to form a batch. The advantage is that upon reception of the activation code all members of the arbitrarily designated batch of receivers will all respond simultaneously. Thus it may be seen that the terminal operator at the transmitter site can create an arbitrary grouping of receivers and cause their subsequent simultaneous activation. This can be a distinct advantage not only in message systems but in simultaneously controlling a plurality of operations at some remote site.

While it is clear that many types and formats of signal coding may be utilized for the present invention the preferred embodiment utilizes a digital signal system designated as the Golay Sequential code. The Golay Sequential Code (GSC) is a selective call paging protocol based largely on the current Golay binary paging format. A full description of the Golay code may be found in a paper entitled "Selective Signalling for Portable Applications" by Leonard E. Nelson, 28th IEEE Vehicular Technology Conference, Denver, Colo., Mar. 22–24, 1978. The Golay Sequential Code is an NRZ binary signaling format that has been greatly modified from an earlier format to accommodate intermixed tone only, tone and data, as well as tone and voice paging and now improved battery saving.

The GSC is an asynchronous paging format which allows pages to be transmitted individually or in batches. Maximum message thoughput for tone only and tone and data pages is achieved in the batch transmission mode; while the individual call mode is useful in tone and voice paging.

The single call address format consists of a preamble, a control word, an address code, and for voice paging, an Activation Code (AC). The preamble serves to divide pagers within the system into groups for improved battery life, as well as to uniquely identify GSC transmissions from other coding schemes to faciliate channel sharing without sacrificing battery life or false call integrity. The control word delimits the end of the preamble and it supplies timing information for the batch mode decoding. The address uniquely identifies each pager and the AC is used to control the pager audio circuits in voice paging. The batch mode of operation allows a string of addresses to be transmitted following the control word.

A data message consists of an address followed by one or more data blocks. Data messages may be transmitted individually in the single call mode or intermixed with address only pages in the batch mode of transmission. Address and data blocks are exactly the same length. The address information is constructed from words selected from the Golay (23, 12) cyclic code while the data information is encoded using the (15, 7) BCH code. Address information is transmitted at 300 bits/second while data information is transmitted at 600 bits/second.

In addition to enabling pagers to operate in a battery saver mode, the polarity of the preamble identifies the transmission mode single call or batch. For instance, when the preamble words are transmitted with one predetermined bit polarity, the single call mode is identified; if the preamble bits are inverted, the batch mode is indicated.

The control word activation code and address code all use a two word format consisting of 28 bits of comma followed by two (23, 12) code words. The comma is a 1, 0 bit reversal pattern transmitted at 600 bits/second. The two Golay code words (Word 1 and Word 2) are separated by a ½ bit space. The polarity of the ½ bit space shall be opposite the first bit of the second word and the starting comma bit must be of the same polarity as the first bit of the first word. The control word and activation code are predetermined for the preferred system. Word 2 of the control word and activation code are the inverses of the fixed words.

The address format is identical to the control word and activation code formats regarding the number of bits, the rules for comma and the ½ bit space. The address Word 2 may be chosen from any word of the (23, 12) code set except the all 0's and all 1's combinations. Thus, there are 4094 potential second words made up of 12 information bits and 11 parity bits. The first words are chosen from a 100 word subset of the Golay code. To generate the binary bit patterns for the (23, 12) Golay code, the decimal representation of the code word is converted to binary. This binary representation is rewritten LSB to the left.

Tone only pages are those pager addresses which don't involve a voice message. Although the single call mode can be used, the batch mode of operation is the preferred method of address transmission for tone only and tone and data pages. The activation code is generally not used in tone only paging, but it may be and an extended batch mode is especially useful in the high traffic periods.

The batch transmission format begins with an inverted preamble followed by the control word and up to 16 pager addresses or data blocks. The arriving page requests should be grouped as a function of preamble and transmitted on a time or traffic basis at the discretion of the terminal manufacturer and his customer.

It may be desirable to transmit more than 16 addresses within a single preamble batch. The extended batch mode is intended for these situations. The extended batch scheme extends the batch mode in multiples of 16 addresses without requiring the retransmission of the preamble. To accomplish this extension, the terminal need only send the control work. In theory, the batch could be extended indefinitely; however, a very slight degradation in pager sensitivity will occur with each extension.

The GSC format allows data pages to be intermixed with tone only or tone and voice pages. A data page consists of a pager address followed by one or more data blocks. A data block is identical in length to an address block and may be freely substituted for addresses in the batch operating mode. The single call mode can also be used by following the pager address with the data message. Data information is transmitted at 600 BPS to minimize the cross falsing probability between addresses and data.

FIG. 1C shows for the preferred embodiment of the present invention the timing diagram the normal message signalling routine for a normal voice page format. FIG. 1C shows that a preamble code signal is transmitted followed by a control word and the address of the individual pager. While this is normal for the operation of pagers generally, the address is followed by an activation code and it is preferably upon the reception and detection of the activation code that the individually addressed pager will commence its two second alert mode to warn the pager user of the presence of a subsequent voice message. At the conclusion of the variable length voice message the preferred embodiment shows the inclusion of a deactivation control word which for the preferred embodiment is the second detected occurence of the activation control word and results in muting the audio channel.

FIG. 1D is a signal timing diagram showing some of the advantages which may be achieved by the use of an activation control signal with respect to the terminal control of a batch formatted group call. FIG. 1D shows that for the preferred embodiment a preamble inverted signal is broadcast followed by a control word and a series of up to 10 distinct addresses for various pagers. An inverse preamble is used as an indicator in the preferred embodiment of the presence of more than one address and the pager maintains the receive operation so that it will look for more than one address. This function will be described in greater detail in the description of the preferred embodiment in both its hardware and firmware equivalent embodiments.

Although each of the pagers has correctly detected its address none of them has caused any alert mode to initiate since the activation code has not been received. At the conclusion of the tenth address, the activation code signal is sent which causes the simultaneous actuation of all ten addressed pagers. For a voice paging message call in a tone and voice system, all ten pagers simultaneously go into their approximate two second alert times to alert all of the ten various users for the presence of a voice message which is to follow. At the conclusion of the alert time the broadcast voice message is simultaneously received by all ten address pagers. At the conclusion of the variable length voice message the second occurrence of the activation code is interpreted in the preferred embodiment as the deactivation control signal to cause muting of the audio channel for all ten addressed pagers and to enable the system to immediately broadcast additional addresses and other paging information. Thus it may be seen that the use of an activation control signal allows the terminal control of an arbitary batch of pagers to achieve a simultaneous function. Moreover a message can be sent to a plurality of pagers arbitrarily selected at the terminal site into a batch simultaneously.

FIG. 1E is a message timing diagram showing the advantages of the use of an activation code to utilize normal unusable alert time for an individually addressed and activated pager to increase the information throughput for the message system by additionally addressing without activation an additional pager. FIG. 1E in sequence shows that a preamble signal is followed by the customary control word, address 1 and an activation code for a first pager. Upon receipt of the activation code the address 1 pager goes into an approximate two second alert time to warn the pager user that a voice message is to follow. Normally for such tone and voice systems or other similar systems, no utilization can be made of the alert time delay. Thus there is a two second loss of otherwise valuable broadcast time during which additional information could be transmitted. As may be seen in FIG. 1E during the two second alert time the preamble control word and second address for a second pager can be transmitted without affecting either the operation of the first pager or the operation of the second pager. At the conclusion of the second address the transmitter then provides the variable length voice message for the first page which is received by only the addressed and activated pager number 1.

At the conclusion of the variable length voice message for pager number 1 the activation code second detection operates as a deactivation code for the addressed and actuated pager 1. This also corresponds to the activation code for the second addressed but as yet not activated pager, thus the second transmission of the activation code positively terminates the operation of the first addressed and activated pager and establishes the normal sequence for operation for the second addressed and now actuated pager.

In normal operation there is a two second address two page alert time during which time a third preamble control word and third address may be transmitted to correctly address but not activate a third pager. As before at the conclusion of the third address the voice message for the second address pager commences and in a manner similar to the voice message for the first pager it will be concluded by the second occurrence of the activation code which for the address and activated pager 2 will be interpreted as a deactivation control word while simultaneously being interpreted by the addressed but as yet unactivated paper 3 as the correct activation code for it to start its alert sequence. Thus it may be seen from FIG. 1E that the overall message information system can be tightly packed with complete utilization of the normal two second alert time which ordinarily would be lost to a transmitter system operator and thus materially enhance the information throughput for the system.

FIG. 1F shows the message timing diagram for an additional variant form of the use of the activation code for what may be referred to as a formatted terminal group call. While FIG. 1D shows the operation of addressing a string of ten or more pagers, because of the construction of the code signal population for the preferred embodiment it was necessary to use the preamble bar designation to cause this system to go into a mode in which more than one address could be decoded. Of necessity this indicates that those addressed pagers must all be in the same proportion of the population so that they can respond to the same preamble. To demonstrate the greatly increased flexibility of an information system employing an activation control word, FIG. 1F shows that the individual pagers which may be grouped do not have to be related by having a common preamble.

FIG. 1F shows that th the transmitter can provide preamble 1 followed by control word and address one which are followed by preamble two, a control word and address two, which is followed by preamble three, control word and a third address. The sequence is purely arbitrary and the length depends on how long the time period has been designated for the system to stay up and look for an activation code. The transmitter then provides an activation code signal which causes the simultaneous activation of all three addressed but not activated pagers from three completly arbitrary groupings of the possible receiver population. At the conclusion of the transmission of the activation code all three address paging receivers simultaneously go into the alert mode and at the conclusion of the alert mode all three pagers simultaneously respond to the then transmitted voice message which is terminated with the second occurrence of the activation code which for the three addressed and actuated pagers constitutes a deactivation control signal.

There are many other variant forms for combinations of the use of an activation control signal and such a message information system. FIG. 1G shows a message timing diagram for a substantially mixed system operation in which a preamble bar signal followed by a control word, three normal addresses, a data address, data information, a voice address for a fifth receiver, all cause three tone only pagers, one data pager and one voice pager to be correctly addressed but not activated. Normally for the preferred embodiment, the activation code is utilized for tone only operation but may be easily modified. The voice address for the fifth pager is then followed by the activation code which causes the voice pager to go into its alert mode so that the pager user can be prepared to receive the voice message. Upon the reception of the activation code it will be appreciated that the first three tone only page carriers have received the signal that a page has been received and that the data page information and subsequent data information which can also be encoded in such systems are already received.

During the alert time for the voice addressed pager nine additional tone only addresses can be broadcast followed by a short time gap for the system of the preferred embodiment which is less than one equivalent word length. This is then followed by the variable length voice message. The variable length voice message is then supplied only to the fifth addressed voice pager which has been activated by the first reception of the activation code. At the conclusion of the variable length voice message the second activation code terminates the operation of the voice channel for the fifth activated voice pager and also causes activation of the nine additional address tone only pagers so that no time is lost in the system.

It will be appreciated by those familiar with such data information systems that normally tone only operation causes an alert signal to be provided to the pager user for a fixed timeout period thus it is not necessary in the case of tone only pages to send a deactivation code to terminate the message since the receiver itself provides an alert for a short fixed length of time. Moreover it may be seen that addressing a data pager and following it subsequently with the data information and then in sequence an activation code will cause first the addressing and detection of the data message and subsequently the activation of the pager to announce the detected message. Those skilled in the art will appreciate that there are many other variant forms of the use of an activation code to material enhance the througput of information in such information transmission systems, especially for the interleaving of messages of mixed type and for the simultaneous activation of previously addressed receiver units. This simultaneous activation can cause functions to occur simultaneously at various remote locations as in combination with the activation code used for selectively and sequentially addressed pagers can cause time sequenced operations to occur at remote locations.

FIG. 2 shows the encoder for transmission of the activation code in accordance with the invention. Control logic 101 comprises a PLA (programmable logic array) that is the sequential logic control for the encoder. The timing for the PLA is provided by timer 103. A word file which stores the digital address of a particular pager and also the digital word for the activation code is provided by a word file 105. A key pad 107 may be used by the operator to indicate to the encoder circuitry which pager the operator wishes to address. A keyboard decoder 109 decodes the keyboard number entered by the operator and outputs an address signal to the word file 105. Simultaneously the key board decoder 109 also notifies the control logic 101 that a key board number has been entered. Binary addresses from the word file 105 are loaded into a shift register 111 thru a parallel data input. Shift register 111 serially clocks out the data entered from the word file 105. The serially outputted data is sent to a transmitter 113 thru a selector circuit 115.

A voice storage unit 117 records a spoken voice thru microphone 119 and amplifier 121 for playback thru the selector circuit 115 to transmitter 113 at an appropriate time. The appropriate time is determined by the sequential logic control circuit 101 as will be more fully explained in connection with FIG. 3. A talk light 123 indicates to the speaker when the voice record unit 117 is in the record mode. An exclusive-OR gate 125 inverts the outputted data from shift register 111 when the sequential control logic 101 provides the exclusive-OR gate 125 with an appropriate input. A page button 127 signals the sequential logic control circuit 101 that the user is ready to send the address of the particular key on keyboard 107. A programmable timer 129 is loaded with appropriate time durations which serve to provide the maximum time durations for certain sequential operations to be described in connection with FIG. 3.

The encoder shown in FIG. 2 is used to transmit data which is intended for a pager utilizing a battery saver mode of operation. The battery saver mode of operation for a pager is a well known method of extending battery life. In a battery saver mode of operation, the total number of pagers in a system are divided into subgroups. Each subgroup has its own particular address usually referred to as a preamble.

The keyboard 107 shown in FIG. 2 has for illustration purposes four pagers divided into two battery saver subgroups. The number of total pagers and subgroups can be much greater and still operate in the same manner. Pagers 1 and 2 belong to a first subgroup and are addressable as a group thru preamble 1 and pagers 3 and 4 belong to a second battery saver subgroup and are addressable thru preamble 2.

Figure 3:
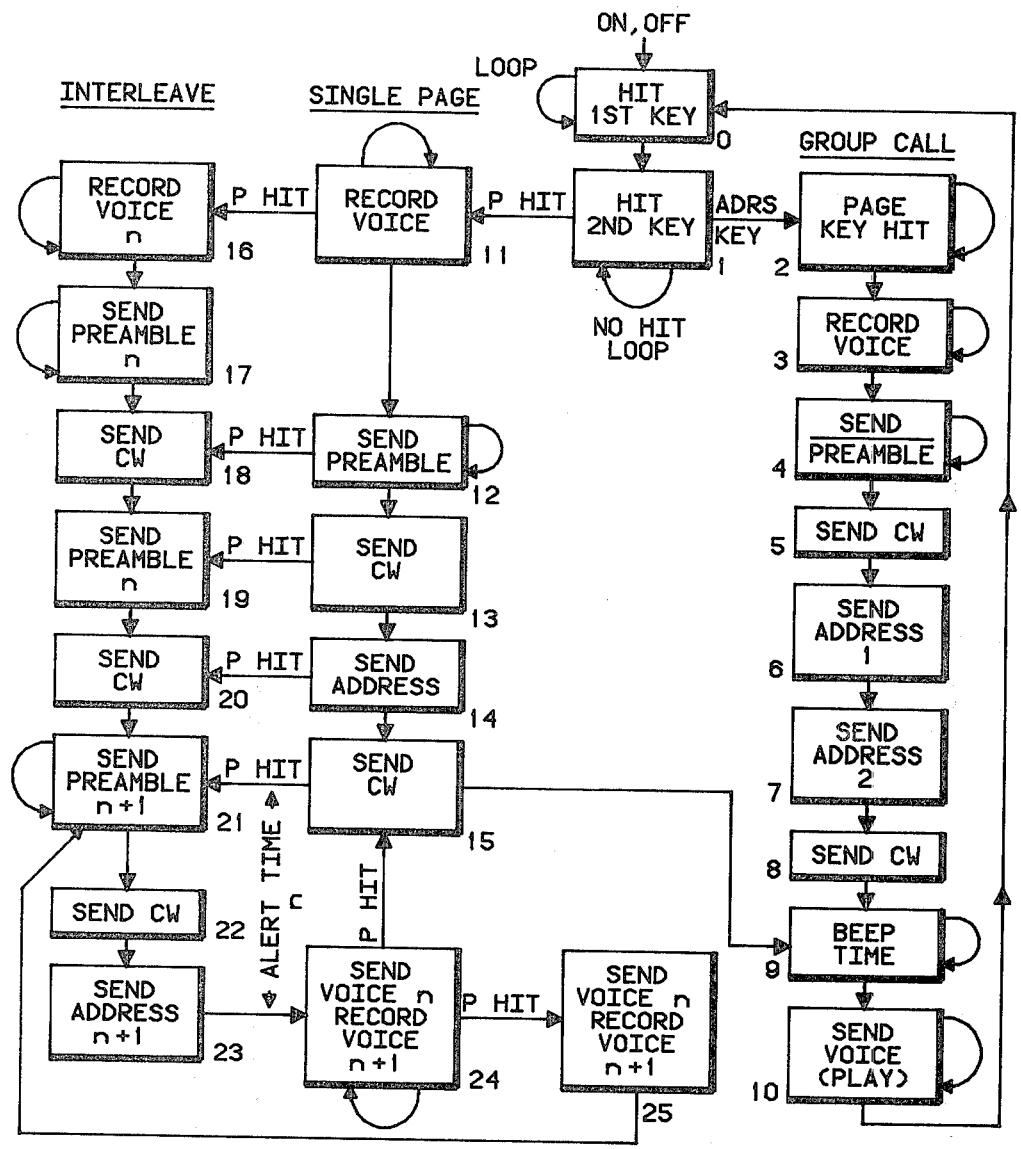
FIG. 3 is a state diagram representing the functions for the diagram of FIG. 2.

FIG. 3 shows the state diagram for the encoder circuitry of FIG. 2. Each state is identified by a rectangle containing a short descriptive phrase. Each state is numbered chronologically from 0 to 25. As is immediately apparent from an inspection to FIG. 2, the operation of the encoder is best described in a time sequential manner from the perspective of the control logic 101.

The state diagram in FIG. 3 is broken into three operational branches. The first is a group call operation. If the operator at the transmitter site wishes to simultaneously send a single voice message to a group of pagers, a plurality of key pads on keyboard 107 corresponding to the pager addresses are pressed before pressing the page key 127 to cause transmission of the information. The second operational branch is the single voice page operation. This is the simplest operation for the encoder as it involves only a single key pad depression corresponding to a pager address followed by a single page key depression. The third operational branch, labeled interleaving operation, utilizes the transmission time in a single voice page transmission that is usually "dead time" or alert time in which the particular pager being addressed cannot further operate on any transmitted signals. For this particular system, this "dead time" is during the period in which the pager sounds an audible altering tone to its user after the pager has received its transmitted address from the encoder. The alert tone warns the user that a voice message is about to follow. Usually the alert lasts approximately two seconds. Correspondingly, after an encoder has transmitted the address of the pager there is a two second period during which the encoder must wait before it transmits the voice message. In one aspect of the present invention during this two second period, the encoder can utilize the "dead time" to transmit a preamble, control word and address to a second pager whose key pad and page key have been pressed.

The state diagram in FIG. 3 should be interpreted in conjunction with the circuit diagram of the encoder in FIG. 2 and serves as the basis for the operation description of the encoder. State 0 is entered by turning on the encoder and the encoder is ready to receive the signal of a first key depression. The control logic 101 is responsive at input B for a signal from the keyboard decoder 109 indicating that a key on keyboard 107 has been depressed. The voice storage unit 117 is neither recording nor playing. The talk light 123 is off. The selector 115 is in an arbitrary state since the transmitter 113 is turned off. The inverter signal I from control logic 101 is also in an arbitrary state since the transmitter 113 is turned off.

In the preferred embodiment the clock CLC from timer 103 for controlling the internal timing of the control logic 101 is a 4.35 hertz clock and is continuously inputted to the load input of shift register 111 by way of the control logic 101. The address input of word file 105 is arbitrary in state 0. The page key 127 is also in an arbitrary state since the control logic 101 is inhibiting its B input. The shift register clock CK from timer 103 is set at 600 Hertz. When an individual page key of key board 107 is pressed, the key board decoder 109 latches the key number and sends a signal to the control logic 101 that a key has been depressed. The control logic 101 moves to a second state shown in FIG. 3 as state number 1 (or the hit second key stage).

In state 1 the control logic 101 is responsive to a second key to be depressed. That key could either be a single key from the key board 107 or it could be the page key 127. The state of the control logic 101 and of the remainder of the encoder is the same as it was in state 0 except that now the control logic 101, in addition to keyboard 107, is responsive to a detection of the page key 127 at the B input of the control logic 101. The two events that may move the encoder out of state 1 have been mentioned before. They are either a page key depression or a second depression of a key pad on key board 107.

Group Call

The event that will be discussed first is the second actuation of a key pad on keyboard 107. This event will cause a transition from state one to state two in the diagram of FIG. 3. Upon depression of a second key pad, the key number from keyboard 107 is latched into the key board decoder 109. The key board decoder 109 again sends out a signal to the control logic 101 at input H that a second key number has been pressed. The occurrence of the second depression of the key pad on key board 107 causes the key board decoder 109 to toggle and to establish an output of the first key pad output code on the address lines of work file 105. This concludes the transition and the encoder is in state 2 as shown in FIG. 3.

The state of the circuitry of the encoder in State 2 is unchanged except the control logic is only looking for a page signal from page key 127. The encoder will move from State 2 to State 3 when it receives a signal from this page key. Immediately following depression of the page key 127, the control logic 101 will load a voice duration time into the programmable timer 129.

In State 3, the control logic 101 and the remainder of the encoder circuitry continues in the same state as it was in previously. Except now the T output of the control logic 101 actuates the talk light 123 and the record input (REC) on the voice storage unit 117. The operator, noticing that the talk light 123 is on, can now speak into microphone 119 and his voice will be recorded in voice storage unit 117 by way of amplifier 121. After the operator has completed his message the programmable counter 129 will time out the voice duration time and cause the encoder to change to State 4.

As the encoder enters State 4 the programmable counter 129 is again loaded but this time with the time duration corresponding to the preamble transmission. Simultaneously with the loading of the programmable timer 129, the control logic circuit sets both $A_0$ and $A_1$ output, which addresses word file 105, to 0 in anticipation of sending the preamble address. The preamble binary code is now present on the output of the word file 105. In State 4, the control logic 101 turns off the talk light 123 and turns off the record input to the voice storage unit 117. The control logic 101 enables the B input of selector 115. The inverting data output I of the control logic 101 activates the exclusive-OR circuit 125. Transmission of the preamble in an inverted format tells the group of pagers recognizing the preamble that a group call made transmission is to follow.

The load input clock operation loads the binary word for the preamble into the shift register 111. The control logic 101 in State 4 inhibits reception of inputs from both the keyboard decoder 109 and from the page key 127. In State 4 the control logic 101 is uneffected by a pressing of the key pads of keyboard 107. Also in state 4, the control logic turns on the transmitter 113. The shift register 111, shifts out the binary code in a serial manner thru exclusive OR gate 125. The data is shifted out at a 600 Hz rate as determined by the 600 Hertz clock inputted to the shift register 111 from timer 103.

As the data passes thru exclusive-OR circuit 125 it is inverted and then supplied to the B input of selector 115. The control logic 101 has told the selector to select the B input to be passed to the output of the selecter 115. Since the transmitter 113 is on, the preamble binary code will be modulated and transmitted. After the programmable counter 129 has timed out the shift register 111 will have completed its serially output of preamble code. When the time out occurs the control logic 101 and the remainder of the encoder transfers from State 4 to State 5 as shown in the diagram in FIG. 3.

As the encoder enters State 5, the $A_0$ and $A_1$ outputs of the control logic 101 are both set to a 1 level. In State 5 the encoder sends the control word which serves to alert the group of pagers under the previously sent preamble that a message is about to follow. In state 5, inverting output of control logic 101 which inputs to exclusive-OR gate 125 is deactivated. The binary code for the control word is outputted by word file 105. It is loaded into the shift register 111 by a load signal from the control logic 101 and serially clocked out of the shift register 111 and into the transmitter 113 by way of selector 115. In State 5 as in State 4 the control logic 101 is still actuating the B input of selector 115. Also the control logic 101 still has the transmitter 113 turned on. As in State 4, the control logic 101 in State 5 has deactivated inputs from the keyboard decoder 109 and its inputs from the pager key 127. The control logic 101 internally times the sending of the control word and moves to state 6 after the time period has timed out. In the transition to State 6, the $A_0A_1$ outputs of logic control circuit 101 changes to 0 for $A_1$ and 1 for $A_1$.

In State 6 as shown in FIG. 3, the first pager address is transmitted. The pager address identifies a particular pager within the selected preamble group. In response to its input address the word file 105 supplies a binary code to the shift register 111. As before the shift register 111 loads the binary code and clocks it out thru the exclusive-OR circuit 125, the B input of selector 115 and finally out to the transmitter 113.

After the shift register 111 is loaded with the binary code for the first address and begins to serially output the data, the control logic 101 must toggle the latch toggle line, LA, to keyboard decoder 109. This causes the key board decoder 109 to present at its output the second pressed key pad number code. The encoder transfers from State 6 to State 7 in accordance with the internal timing scheme of control logic 101 when the internal control logic of control circuit 101 determines that the first address has been sent.

In the beginning of this state 7 the keyboard decoder 109 is providing the address corresponding to the second key pad depressed. The output of word file 105 is the binary code for the pager address identified with that particular key pad. The shift register 111 is loaded again, as before, but this time the data loaded is the binary code of the pager address of the second key pad pressed. Again the data is serially shifted out thru selecter 115 and to the transmitter 113. After the shift register 111 is loaded, the control logic 101 changes the $A_0$ output level to 1. The control logic 101 determines by internal timing when the second address has been serially transmitted. At the end of this time the encoder transfers from state 7 to state 8.

In State 8 with the $A_0$ output level at 1, the word file 105 binary address requests for the control word again. The word file 105 outputs the binary code for the control word and the shift register 111 loads the binary code and serially shifts the data out to the transmitter 113. The programmable timer 129 is set internally to time the tone alert or beep time duration which will occur at the pager when it receives the control word.

The timing of the beep duration is done in state 9 after the control word in state 8 has been sent, the encoder moves to state 9 where the internal counter 129 times out the beep duration. The alert time duration represents the time period of which the pager unit sounds a tone to alert the user that a voice message will immediately follow.

In order to avoid transmitting during the time that the pager is beeping, the programmable timer 129 counts that beeping period as measured from the time of transmission of the second control word and ensures that no transmissions occur during that time (usually around 2 seconds). At the end of the beep duration, the timer 129 times out and the encoder moves to state 10 as shown in FIG. 3.

As the encoder moves to state 10 the control logic 101 loads the programmable timer 129 again. This time with a binary code for the duration of the voice to be transmitted. This time duration is preferably constant, thereby allowing for a maximum stored message length. The time duration is determined by the running time of one complete loop of the voice storage unit 117.

In State 10, the control logic 101 activates the play input operation of the voice storage unit 117 and actuation of the A input of selecter 115. The transmitter 113 is turned on. The recorded voice is transmitted over transmitter 113 and the encoder waits for the timing out of the voice duration time in programmable timer 129. At the end of the time out the encoder returns to state 0 as is shown in FIG. 3.

Single Page

Referring back to the second state transition option in State 1, a page key can be depressed in state 1 instead of a second address key. Depressing the page key transfers the encoder from state 1 to state 11. In the transition from state 1 to state 11 the programmable timer 129 is loaded with a voice duration time period. In state 11 everything in the encoder is as it was initialized in state 1. The talk light is turned on and the record input to the voice storage unit 117 is also turned on and begins to record. If while in State 11 a key pad on keyboard 107 is again depressed, its address will be latched into the key board decoder 109. By analogy State 11 is identical to state 3 discussed previously except that in state 11 the encoder is looking for a time out message from programmable timer 129 and a page key detection at input B of control logic 101.

Two possible transitions exist from state 11, the encoder can move to state 12 or to state 16. The transition from 11 to 16 will be described later in the discussion of interleaving. If no additional key address is pressed, then the encoder will move to state 12 when the programmable timer 129 times out. During the transition the programmable timer 129 is loaded with the time period required for the transmission of the preamble.

In State 12 the encoder outputs are in the same condition as they were in state 4 except the inverting output, I, of the control logic 101 is not activated. Also the control logic is now sensitive to a page signal at its B input as it was in State 11. The transition from state 12 can be to two different states. State 18 or from state 12 to state 13. If a new key address is pressed at the keyboard 107, the transition will be from state 12 to state 18. This transition will be described later. The transition from state 12 to state 13 is identical to the transition from state 4 to state 5.

State 13 is substantially the same as state 5 except the control logic 101 is looking for an input from the page key as it was in States 11 and 12. From state 13 if a page key is detected the transition is to state 19. This transition will be described later in connection with interleaving. Without a page key detection at the B input of control logic 101 the transition from State 13 is to State 14. This transition is identical to the transition from State 5 to State 6.

State 14 is substantially identical to state 7 except that the control logic 101 is still looking for a page key signal as it was in states 11, 12 and 13. If the control logic 101 receives a page key signal at its B input the encoder will experience a transition from stage 14 to 21. This transition will also be described later. Without a page key signal detection, the encoder will transfer state 14 to state 15. This transition is identical to the transition from state 7 to state 8.

State 15 is substantially identical to state 8 except that the control logic 101 is still responsive to a page key signal at its B inputs as it was in states 11-14. If the page key signal is detected by the control logic 101, the transition for the encoder is from state 15 to state 21 which will be described later in connection with interleaving. Without a page key detection the encoder transfers from state 15 to state 9 as shown in FIG. 3. This transition is the same as the transition from state 8 to state 9.

Interleaving

The state transitions whose discussions have been deferred will be covered in the description of the interleaving operation. Returning back to state 11, if a page key is pressed while the encoder is in this state, the transition will be from state 11 to state 16. In this transition the programmable timer 129 continues counting from state 11 into state 16. State 16 is substantially similar to state 3 with the transition being caused by the timing out of the programmable timer 129. From state 16 the transition is to state 17. This transition is the same as the transition from state 3 to state 4 except that the inverting signal, 1 from the control logic 101 into exclusive-OR 125 is not activated.

State 17 is substantially similar to state 4. The transition from state 17 to State 18 is identical to the transition from state 4 to state 5. State 18 is substantially similar to state 5. The transition from state 18 to state 19 is identical to the transition from state 5 to state 6. State 19 is substantially similar to state 7. The transition from state 19 to state 20 is identical to the transition from state 7 to state 8.

State 20 is similar to state 8, except that the control logic 101 toggles, through its LA output, the keyboard decoder 109 to cause the key decoder to output on lines A₂ and A₃ the most recently pressed key pad on keyboard 107. The control logic 101 sets both A₀ and A₁ to 0. The programmable timer 129 is loaded with a time duration sufficient for the transmission of the preamble in state 21. The transition from state 20 to state 21 is automatically timed in control logic 101.

In state 21 the encoder is in a state identical to state 4. The transition from state 21 to state 22 is identical the the transition from state 4 to state 5. State 22 is identical to state 5. The transition from state 22 to state 23 is identical to the transition from state 5 to state 6. State 23 is substantially similar to state 7. The transition from state 23 to state 24 is identical to the transition from state 9 to state 10.

In state 24 the encoder is in a state substantially similar to state 10 except the control logic 101 is sensitive to a page key depression and the talk light 123 and voice storage unit 117 are turned on. The operator's message directed to the second keyed pager is now recorded into the voice storage unit 117. The second voice message is associated with the key pad and page key pressed and sensed in state 11. The transition from state 24 to state 15 is caused by the timing out of the control timer 129 without a page key being pressed.

From state 15 the sequence repeats its normal pattern to either state 9 or state 21. If a page key depression is sensed in state 24 the encoder will transfer from state 24 to state 25. This transition is identical to that from from state 11 to state 16. State 25 is substantially similar to state 10 except that the control logic 101 holds the talk light 123 on and also continues to record the next voice message. After the completion of the second voice message, the encoder transfers from state 25 to state 21. From state 21, the encoder repeats the steps from state 21 thru state 24. At state 24 the encoder again looks for a page key depression. A detection of the page key hit determines whether the next state of the pager is state 15 or state 25 as was described earlier.

State transitions from single page operation into interleaving operation are caused by the encoder detecting a page key depression while in states 12, 13, 14 or 15. A page key depression detected in these states will result in the encoder transferring to an interleaving state. States 12, 13, 14 and 15 will transfer to states 18, 19, 20 and 21 respectively. If the encoder enters interleaving at state 21, the encoder must toggle the LA input to keyboard decoder 109 in addition to its normal operations in state 21.

It should be noted that if a squelch mechanism is used to terminate voice transmission, there would be a need for two voice storage units. The need arises since with a squelch mechanism the two voices stored in the voice storage units are no longer necessarily the same time length.

It should also be noted that the encoder of the invention can be incorporated into a telephone exchange system in a well known manner.

Table 1 on the following page is a time sequential logic table of the PLA comprising control logic 107 in accordance with the invention.

| Inputs | | | Present State | | | | | | | | | | Outputs | | | | | | | Programmable Timer Count |
|---|---|---|---|---|---|---|---|---|---|---|---|---|---|---|---|---|---|---|---|---|
| (o) | H | B | $Q_4$ | $Q_3$ | $Q_2$ | $Q_1$ | $Q_0$ | $D_4$ | $D_3$ | $D_2$ | $D_1$ | $D_0$ | T, | P, | S, | K, | I, | LA | $A_0$ $A_1$ | |
| X | 0 | X | 0 | 0 | 0 | 0 | 0 | 0 | 0 | 0 | 0 | 0 | 0 | 0 | X | 0 | X | 0 | X X | |
| X | 1 | X | 0 | 0 | 0 | 0 | 0 | 0 | 0 | 0 | 0 | 1 | 0 | 0 | X | 0 | X | 0 | X X | |
| X | 1 | 0 | 0 | 0 | 0 | 0 | 1 | 0 | 0 | 0 | 1 | 0 | 0 | 0 | X | 0 | X | 0 | X X | |
| X | 0 | 0 | 0 | 0 | 0 | 0 | 1 | 0 | 0 | 0 | 0 | 1 | 0 | 0 | X | 0 | X | 0 | X X | |
| X | X | 0 | 0 | 0 | 0 | 1 | 0 | 0 | 0 | 0 | 1 | 0 | 0 | 0 | X | 0 | X | 0 | X X | |
| X | X | 1 | 0 | 0 | 0 | 1 | 0 | 0 | 0 | 0 | 1 | 1 | 0 | 0 | X | 0 | X | 0 | X X | Voice Duration = 8 Sec. |
| 0 | X | X | 0 | 0 | 0 | 1 | 1 | 0 | 0 | 0 | 1 | 1 | 1 | 0 | X | 0 | X | 0 | X X | |
| 1 | X | X | 0 | 0 | 0 | 1 | 1 | 0 | 0 | 1 | 0 | 0 | 1 | 0 | X | 0 | 0 | 0 | X X | Preamble Duration = 1.68 Sec. |
| 0 | X | X | 0 | 0 | 1 | 0 | 0 | 0 | 0 | 1 | 0 | 0 | 0 | 0 | 0 | 1 | 1 | 0 | 0 0 | |
| 1 | X | X | 0 | 0 | 1 | 0 | 0 | 0 | 0 | 1 | 0 | 1 | 0 | 0 | 0 | 1 | 1 | 0 | 0 0 | |
| X | X | X | 0 | 0 | 1 | 0 | 1 | 0 | 0 | 1 | 1 | 0 | 0 | 0 | 0 | 1 | 0 | 0 | 1 X | |
| X | X | X | 0 | 0 | 1 | 1 | 0 | 0 | 0 | 1 | 1 | 1 | 0 | 0 | 0 | 1 | 0 | 1 | 0 1 | |
| X | X | X | 0 | 0 | 1 | 1 | 1 | 0 | 1 | 0 | 0 | 0 | 0 | 0 | 0 | 1 | 0 | 0 | 0 1 | |
| X | X | X | 0 | 1 | 0 | 0 | 0 | 0 | 1 | 0 | 0 | 1 | 0 | 0 | 0 | 1 | 0 | 0 | 1 X | Beep Time = 2 Sec. |
| 0 | X | X | 0 | 1 | 0 | 0 | 1 | 0 | 1 | 0 | 0 | 1 | 0 | 0 | 0 | 0 | X | 0 | X X | |
| 1 | X | X | 0 | 1 | 0 | 0 | 1 | 0 | 1 | 0 | 1 | 0 | 0 | 0 | 0 | 0 | X | 0 | X X | Voice Duration = 8 Sec. |
| 0 | X | X | 0 | 1 | 0 | 1 | 0 | 0 | 1 | 0 | 1 | 0 | 0 | 1 | 1 | 1 | X | 0 | X X | |
| 1 | X | X | 0 | 1 | 0 | 1 | 0 | 0 | 0 | 0 | 0 | 0 | 0 | 1 | 1 | 1 | X | 0 | X X | |
| X | 0 | 1 | 0 | 0 | 0 | 0 | 1 | 0 | 1 | 0 | 1 | 1 | 0 | 0 | X | 0 | X | 0 | X X | Voice Duration = 8 Sec. |
| 0 | X | 0 | 0 | 1 | 0 | 1 | 0 | 0 | 1 | 0 | 1 | 1 | 1 | 0 | X | 0 | X | 0 | X X | |
| 1 | X | 0 | 0 | 1 | 0 | 1 | 1 | 0 | 1 | 1 | 0 | 0 | 1 | 0 | X | 0 | X | 0 | X X | Preamble Duration |
| 0 | X | 0 | 0 | 1 | 1 | 0 | 0 | 0 | 1 | 1 | 0 | 0 | 0 | 0 | 0 | 1 | 0 | 0 | 0 0 | |
| 1 | X | 0 | 0 | 1 | 1 | 0 | 0 | 0 | 1 | 1 | 0 | 1 | 0 | 0 | 0 | 1 | 0 | 0 | 0 0 | |
| X | X | 0 | 0 | 1 | 1 | 0 | 1 | 0 | 1 | 1 | 1 | 0 | 0 | 0 | 0 | 1 | 0 | 0 | 1 X | |
| X | X | 0 | 0 | 1 | 1 | 1 | 0 | 0 | 1 | 1 | 1 | 1 | 0 | 0 | 0 | 1 | 0 | 0 | 0 1 | |
| X | X | 0 | 0 | 1 | 1 | 1 | 1 | 0 | 1 | 0 | 0 | 1 | 0 | 0 | 0 | 0 | 0 | 1 | X | Beep Time = 2 Sec. |
| 0 | X | 1 | 0 | 1 | 0 | 1 | 1 | 1 | 0 | 0 | 0 | 0 | 1 | 0 | 0 | 0 | X | 0 | X X | Dont'd reload Counter |
| 0 | X | X | 1 | 0 | 0 | 0 | 0 | 1 | 0 | 0 | 0 | 0 | 1 | 0 | 0 | 0 | X | 0 | X X | |
| 1 | X | X | 1 | 0 | 0 | 0 | 0 | 1 | 0 | 0 | 0 | 1 | 1 | 0 | X | 0 | X | 0 | X X | Preamble Duration |
| 0 | X | X | 1 | 0 | 0 | 0 | 1 | 1 | 0 | 0 | 0 | 1 | 0 | 0 | 0 | 1 | 0 | 0 | 0 0 | |
| 1 | X | X | 1 | 0 | 0 | 0 | 1 | 1 | 0 | 0 | 1 | 0 | 0 | 0 | 0 | 1 | 0 | 0 | 0 0 | |
| X | X | X | 1 | 0 | 0 | 1 | 0 | 1 | 0 | 0 | 1 | 1 | 0 | 0 | 0 | 1 | 0 | 0 | 1 X | |
| X | X | X | 1 | 0 | 0 | 1 | 1 | 1 | 0 | 1 | 0 | 0 | 0 | 0 | 0 | 1 | 0 | 0 | 0 1 | |

Figure 4:
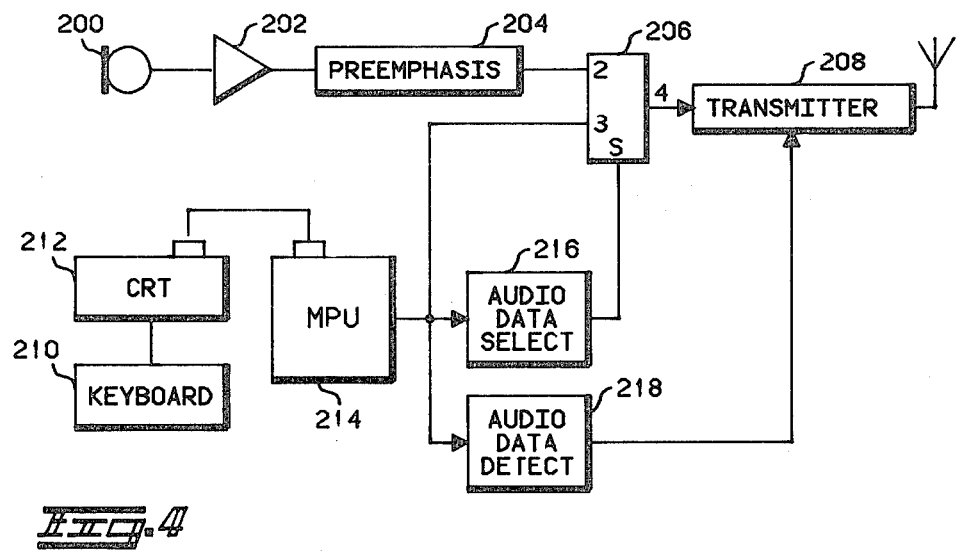
FIG. 4 is a functional block diagram of the firmware embodiment of the present invention.

FIG. 4 shows the functional block diagram of the encoder for the preferred embodiment of the invention in which a microphone 200 is coupled through an audio amplifier 202 to a preemphasis circuit 204 which finally produces an audio signal. This audio signal is supplied to a pair of transmission gates 206 which, as will be described in detail later, allow for the selection of either audio or data information to be transferred to the modulating input of a transmitter 208. An antenna 209 is coupled to transmitter 208. The transmission gates 206 are preferably of the type manufactured by Motorola and designated MC14551. A keyboard 210 is coupled to a CRT 212. This combination is preferably a Lear Siegler Model ADM-3A. The RS232 output of the CRT is coupled to a 6800 base computer 214 which further includes the several additional modules which are: a MEX 6820 I/O module, a 68MM19 6809 monoboard, microcomputer, a MEX6812-1 2K static RAM, and a M68MMCC05 Card Cage for a micro module.

A PB0 output of computer 214 is coupled to the data input of transmission gate 206, the input of an audio data select circuit 216 and the input of an audio/data detect circuit 218. The output of the audio/data select circuit 218 is coupled to the selection input of the transmission gate 206. A zero logic level at this selection input terminal indicates that the data transmission gate is activated and a 1 level indicates that the audio information gate is activated to supply the corresponding information to the modulating input of transmitter 208.

The output of audio data detect circuit 218 keys the transmitter so that the operation of audio data detect circit 218 is similar to an OR function in that if either signal is detected as being present at its input, the transmitter is keyed so that input may be modulated by the RF carrier. The combined signal is supplied to antenna 209 for broadcast.

Figure 5:
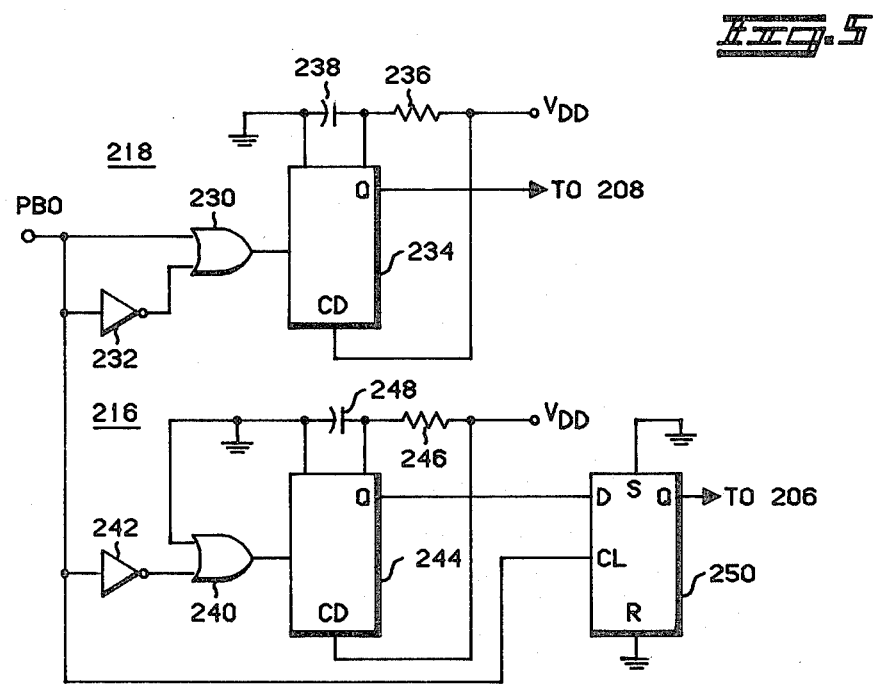
FIG. 5 is an electrical schematic of a portion of FIG. 4.

FIG. 5 shows the detailed circuitry for audio/data detect circuit 218 and audio data select circuit 216. The PBO output of computer 214 is coupled to the input terminal of audio data detector 218 which comprises a retriggerable monostable. The circuit operates to maintain a constant signal output so long as a signal edge is detected within a predetermined time period of every 100 milleseconds. The absence of a detected signal edge during that time period would indicate that neither data nor audio signals were present.

In the operation of the audio/data detector circuit 218, the PBO output terminal of computer 214 is coupled directly to a first input of an OR gate 230 and through an inverter 230 to the second input. The output of OR gate 230 is coupled to the trigger input of a monostable 234 which may be implemented using one-half of an IC designated MC14538. A timing network is provided for the monostable and VDD, the source of voltage, is applied to the clear input terminal of monostable 234. The VDD is also applied through a resistor 236 to a timing input of the monostable and through a capacitor 238 connected to ground. The combination of the resistor 236 and capacitor 238 provide a timing circuit for monostable device 234. The Q1 output of monostable 234 is coupled directly to transmitter 208 as shown in FIG. 4 to provide the transmitter keying control signal.

The function of the audio data dector 218 is to receive within every 100 millesecond interval an edge indicating that either a data or an audio signal is present on the line. As each edge is detected in the OR gate 230, it retriggers monostable 234 for its predetermined time.

As long as pulses are received at an interval that is less than the normal time out for the monostable, a Q1 output of monostable 234 in audio data detector 218 will remain at a logic level thereby keying the transmitter.

The PBO output of computer 214 is also connected directly to the first input of an OR gate 240 and through an inverter 242 to the second input of OR gate 240. The first input of OR gate 240 is coupled to ground. The output of OR gate 240 is coupled to the trigger input of a second retriggerable monostable 244. Monostable 244 is preferably half of the same IC package which was utilized to implement audio/data detector circuit 218. For monostable 244, VDD is applied in the same manner to produce a somewhat different timing characteristic for its operation. This new time is chosen by the value of a resistor 246 and capacitor 248 which are coupled to the timing inputs of monostable 244. VDD is also connected to the clear input terminal of monostable 244. The Q2 terminal of monostable 244 is coupled to the D input terminal of a data flip-flop 250.

The PBO output of computer 214 is also coupled to the clock input of D flip-flop 250. The set input of the data flip-flop 250 is connected to ground. Flip-flop 250 is preferably one-half of an IC designated MC14013. The Q output of flip-flop 250 provides the control signal output of audio/data select circuit 216 which is supplied to transmission gates 206 and causes the selective activation of one of the gates depending upon whether either the audio or data information is to be supplied to the modulating input of the transmitter.

When it is desired to transmit an audio signal, the encoder for the present embodiment is designed to respond to the presence of a 600 Hz signal so that the activation of an external microphone or other voice storage and forwarding device may be achieved to insert the voice message into the transmission at the appropriate time. There are several other reasons for using various square wave signals at predetermined frequencies but with respect to the present invention only the presence of a 600 Hz signal is used for this specific purpose.

Audio data selection circuit 216 operates as a tone detector in which OR gate 240 is triggered on the detection of a squarewave signal edge to produce a relatively long duration output pulse at the Q2 output terminal of monostable 244. This signal is supplied to the D input of the flip-flop which is also coupled directly to the PBO output of computer 214 through its clock terminal. If the long duration pulse from the monostable continues during the time that a subsequent squarewave signal edge is detected from the PBO output of the computer, data flip-flop 250 is either maintained at or is toggled to the 1 logic level output at its Q terminal. This indicates detection of the 600 Hz signal. Termination of the long duration pulse from the monostable before an edge occurs at the clock terminal of the data flip-flop would cause it to toggle to zero or maintain it at zero thus indicating that no 600 Hz audio signal had been selected and therefore no audio signal was to be transmitted.

Figure 6:
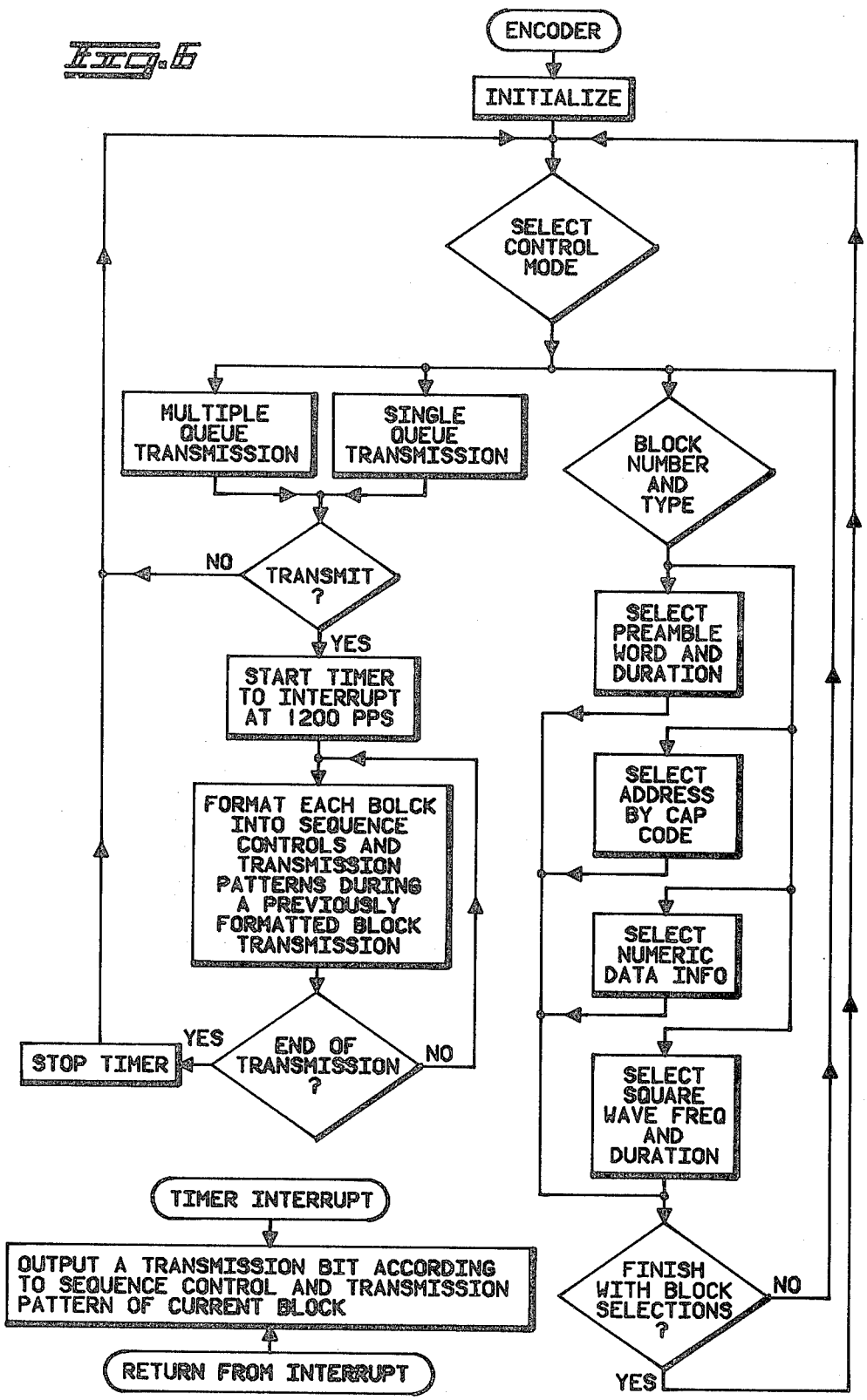
FIG. 6 is a flowchart for the firmware embodiment of the present invention.

FIG. 6 represents the flowchart for the firmware operation of the encoder shown in FIGS. 4 and 5. When the encoder is activated, it goes through an initialization routine in which all registers are set so that the program can be loaded and executed. After initialization, control is transferred to a decision block at which time the operator selects control mode. There are three possible control modes; first is the selection of multiple queue transmissions; the second is the selection of single queue transmissions; and most importantly the third is the selection for the block number and type of information to be transmitted.

The block number allows the operator to select in a given message sequence exactly where information is to be inserted. The type of information refers directly to the coding system utilized and allows the operator to select the preamble number and the duration of the preamble signal and to select the first and second address words for the echo coding system of the preferred embodiment. Completion of this operation establishes the addresses of the pagers which can be paged. In normal operation, subscriber addresses would be maintained in a memory file status so that individual pagers could be correctly addressed.

The next operator choice is the selection of whether or not to specify numeric data information which produces a block of numeric data suitable for transmission to a numeric or data pager. The last operator selection is a frequency signal which for the preferred GSC coding embodiment is indicative of a tone and voice operation for pagers. This has already been described in detail.

At the conclusion of the selection of the four types of information, control is transferred to a decision block to determine whether or not all of the selections are completed. If not, the control of the operation is again returned to the select block of number and type operation at which time additional locations for blocks of information may be selected and additional types designated. The selection of the block number and type of information and whether or not the message is to be data tone only or tone and voice would be made for each block of information. After all of the decisions are made and the operator is finished with the block selection, control of the operation is returned to the select mode decision block at which time the operator can choose among the three possible mode operations including adding additional information to the assemblage of blocks and information.

The selection of multiple queue transmissions or single queue transmissions enable information of the designated blocks in sequences of information to be sent singly, that is in one transmission, or to be repeated a number of times. Normally, only the single queue transmission would be used, however for the purpose of sending extremely long messages, the use of a redundancy can be built in to ensure even greater reliability of the reception of long complex messages.

At the conclusion of the select queue operation for the transmission, control is transferred to the transmit decision block. If at this time the operator elects no transmission, operation of the program is again returned to the select control mode. If the operator chooses to transmit, control is transferred to the start timer operation.

The start timer operation takes the blocks of information and formats them into various transmission patterns. At regular intervals of 1200 times per second, the information storage buffers in which the information has been formatted are accessed by a timer interrupt routine which takes the output of a given buffer and provides one bit of information to a sequence control operation so that the transmission pattern may be sent out one bit at a time. At the end of each interruption, control of the program returns to the formatting operation at which time additional information may be loaded into the buffers.

In operation the format control takes the blocks of information as designated and selected and loads them into temporary storage buffers so that they may be emptied on a time interrupt bit by bit basis and provided to the transmitter. The output from the transmitter is digital logic signals superimposed on a carrier at the rate of 1200 bits per second.

As the various information storage buffers are emptied on a bit for bit basis, the formatting routine continues to load the additional selected information. The buffers may be drained serially to produce the message sequence. At the end of the information in the last stored buffer, the decision to end transmission is made. If it is not the end of the transmission, control is returned to the formatting block so that additional transmission patterns may be loaded into the information storage buffers so that they may be accessed to provide the information for the transmission. If the decision from the end of transmission decision block is to stop, then a stop timer routine is activated at which time control is transferred back to the select control mode operation.

Included with this primary flowchart is a separate secondary flowchart for the timer interrupt routine which on a regular 1200 times per second basis interrogates the information sequence stored in the storage buffers and provides an output to the transmitter. At the conclusion of the transfer of each bit of information control of the operation is transferred back to the formatting operation in the primary flowchart.

Table 2 shows the hexadecimal core dump of the entire firmware coding program consistent with the language appropriate for the computer shown in FIG. 4. Loading of this code into the ROM will provide the operation described by the flowchart in FIG. 6.

TABLE 2

| | | | | | | | | | | | | | | | | |
|---|---|---|---|---|---|---|---|---|---|---|---|---|---|---|---|---|
| 3000 | 8E | F0 | 00 | BD | D4 | A7 | 8E | 00 | 00 | A6 | 0A | 81 | 30 | 27 | 03 | BD |
| 3010 | D4 | B4 | A6 | 0B | BD | D4 | B4 | 86 | 2E | BD | D4 | B4 | 9E | 11 | A6 | 84 |
| 3020 | 84 | F0 | 81 | F0 | 27 | 09 | 8E | F0 | 6B | BD | D4 | A7 | 7E | D3 | 93 | 9E |
| 3030 | 11 | A6 | 84 | 84 | 0F | 1F | 89 | 4D | 48 | 34 | 04 | AB | E0 | 8E | D3 | 54 |
| 3040 | 9F | 18 | D6 | 19 | 34 | 04 | AB | E0 | 97 | 19 | D6 | 18 | C9 | 00 | D7 | 18 |
| 3050 | 9E | 18 | 6E | 84 | 7E | D1 | 4C | 7E | D0 | 84 | 7E | D1 | C0 | 7E | D1 | FB |
| 3060 | 7E | D0 | D0 | 7E | D2 | 61 | 7E | D2 | A7 | 7E | D2 | CB | 7E | D2 | E2 | 7E |
| 3070 | D3 | 14 | 7E | D0 | 26 | 7E | D0 | 26 | 7E | D0 | 26 | 7E | D0 | 26 | 7E | D0 |
| 3080 | 26 | 7E | D0 | 26 | 8E | F0 | 89 | BD | D4 | A7 | 9E | 11 | A6 | 02 | BD | D4 |
| 3090 | B4 | A6 | 03 | BD | D4 | B4 | A6 | 04 | BD | D4 | B4 | A6 | 05 | BD | D4 | B4 |
| 30A0 | A6 | 06 | BD | D4 | B4 | A6 | 07 | BD | D4 | B4 | 86 | 2E | BD | D4 | B4 | A6 |
| 30B0 | 01 | 85 | 01 | 26 | 0A | 9E | 11 | A6 | 01 | 85 | 02 | 26 | 0A | 20 | 0E | 8E |
| 30C0 | F0 | A1 | BD | D4 | A7 | 20 | EE | 8E | F0 | C0 | BD | D4 | A7 | 7E | D3 | 93 |
| 30D0 | 8E | F0 | E2 | BD | D4 | A7 | 9E | 11 | A6 | 02 | 84 | 0F | 81 | 01 | 27 | 11 |
| 30E0 | 81 | 02 | 27 | 12 | 81 | 04 | 27 | 13 | 81 | 08 | 27 | 14 | 8E | F1 | 11 | 20 |

```
30F0 12 8E F0 F6 20 0D 8E F0 FD 20 08 8E F1 04 20 03
3100 8E F1 0B BD D4 A7 8E F1 19 BD D4 A7 8E F1 25 BD
3110 D4 A7 9E 11 A6 01 BD D4 B4 86 2E BD D4 B4 8E F1
3120 3E BD D4 A7 BD D1 30 8E F1 54 BD D4 A7 7E D3 93
3130 8E 11 A6 03 BD D4 B4 A6 04 BD D4 B4 A6 05 BD D4
3140 B4 A6 06 BD D4 B4 A6 07 BD D4 B4 39 8E F1 5E BD
3150 D4 A7 9E 11 A6 02 BD D4 B4 A6 03 BD D4 B4 A6 03
3160 85 01 26 07 86 2E BD D4 B4 20 06 8E F1 6C BD D4
3170 A7 9E 11 A6 01 85 01 27 06 8E F1 77 BD D4 A7 8E
3180 F1 8C BD D4 A7 9E 11 A6 03 85 01 26 2A A6 07 BD
3190 D4 B4 9E 11 A6 06 85 02 26 07 86 2E BD D4 B4 20
31A0 06 8E F1 6C BD D4 A7 9E 11 A6 01 85 02 27 0E 8E
31B0 F1 77 BD D4 A7 20 06 8E F1 9C BD D4 A7 7E D3 93
31C0 8E F1 A2 BD D4 A7 9E 11 86 06 97 1A A6 02 BD D3
31D0 3A 30 01 0A 1A 26 F5 86 2E BD D4 B4 9E 11 A6 01
31E0 85 04 27 06 8E F1 B6 BD D4 A7 9E 11 A6 01 85 01
31F0 27 06 8E F1 77 BD D4 A7 7E D3 93 8E F1 DB BD D4
3200 A7 8E F1 A6 BD D4 A7 8E 00 1B 9F 21 9E 11 9F 23
3210 9E 23 A6 02 30 01 9F 23 9E 21 A7 84 30 01 9F 21
3220 8C 00 21 26 EB C6 08 8E 00 1B 4F 69 84 49 30 01
3230 8C 00 21 26 F6 8B 20 BD D4 B4 5A 2E EA 86 2E BD
3240 D4 B4 9E 11 A6 01 85 04 27 06 8E F1 36 BD D4 A7
3250 9E 11 A6 01 85 01 27 06 8E F1 77 BD D4 A7 7E D3
3260 93 8E F1 E6 BD D4 A7 8E F2 02 BD D4 A7 9E 11 6D
3270 01 27 11 86 24 BD D4 B4 A6 01 BD D3 3A 86 2E BD
3280 D4 B4 20 06 8E F1 9C BD D4 A7 8E F1 3E BD D4 A7
3290 9E 11 C6 05 A6 03 BD D4 B4 30 01 5A 2E F6 8E F1
32A0 54 BD D4 A7 7E D3 93 8E F2 13 BD D4 A7 9E 11 A6
32B0 01 BD D4 B4 86 2E BD D4 B4 8E F1 3E BD D4 A7 BD
32C0 D1 30 8E F1 54 BD D4 A7 7E D3 93 8E F2 26 BD D4
32D0 A7 8E F1 3E BD D4 A7 BD D3 81 86 2E BD D4 B4 7E
32E0 D3 93 8E F2 39 BD D4 A7 9E 11 A6 03 BD D4 B4 8E
32F0 F1 6C BD D4 A7 8E F2 4F BD D4 A7 BD D3 81 86 2E
3300 BD D4 B4 9E 11 A6 01 85 01 27 06 8E F2 7A BD D4
3310 A7 7E D3 93 8E F2 A5 BD D4 A7 9E 11 A6 04 BD D4
3320 B4 BD D3 81 86 2E BD D4 B4 9E 11 A6 01 85 01 27
3330 06 8E F1 77 BD D4 A7 7E D3 93 34 02 84 0F BD D3
3340 4B 35 02 44 44 44 44 BD D3 4B 39 81 0D 27 18 81
3350 0E 27 18 81 0A 27 18 81 0B 27 18 81 00 27 18 81
3360 0C 27 18 8A 30 20 16 86 20 20 12 86 2D 20 0E 86
3370 30 20 0A 86 2F 20 06 86 45 20 02 86 00 BD D4 B4
3380 39 9E 11 A6 05 BD D4 B4 A6 06 BD D4 B4 A6 07 BD
3390 D4 B4 39 BD D5 31 39 8E 00 84 6F 84 30 01 8C 01
33A0 6B 26 F7 8E 00 90 9F 9C 9F 9E 86 0F 97 98 8E DE
33B0 D4 9F A0 86 98 97 7F 4C 97 7E 97 7D 7F EC 18 B6
33C0 EC 19 BE EC 1C 12 1C FF 96 80 9A 81 9A 82 26 15
33D0 96 90 9A 91 9A 92 9A 93 26 F6 12 1A 10 86 01 B7
33E0 EC 18 7E D5 31 8E 00 03 1A 01 A6 89 00 7F A9 89
33F0 00 7C 19 A7 89 00 7F 30 1F 26 EF 8E E2 00 9F 11
3400 9E 11 A6 84 84 F0 81 F0 26 BE A6 84 8E D4 24 9F
3410 86 84 0F 48 9B 87 97 87 96 86 89 00 97 86 9E BD
3420 AE 84 6E 84 D4 38 DC 01 D9 69 D4 38 D7 9F D4 38
3430 D4 38 D4 38 D7 3A D4 38 96 12 8B 08 97 12 96 11
3440 89 00 97 11 7E D4 00 12 1A 10 10 CE E1 FF 8E DE
3450 6A BF FF F8 86 03 B7 90 02 86 04 B7 90 03 86 C1
3460 B7 EC 19 8E 00 07 BF EC 1C 86 03 B7 EC 14 86 91
3470 B7 EC 14 86 00 97 83 8E F8 34 9F 0C AE 84 AD 84
3480 20 FA B6 EC 14 47 24 FA B6 EC 15 84 7F 34 04 F6
3490 EC 14 57 57 24 F9 B7 EC 15 35 04 39 BD D5 31 AE
34A0 84 8D 04 BD D5 31 39 A6 84 81 04 27 06 8D 05 30
34B0 01 20 F4 39 D6 83 C5 40 27 1E 34 02 81 0A 27 09
34C0 86 00 BD D4 8D 35 02 20 0F 86 32 97 17 86 00 BD
34D0 D4 8D 0A 17 26 F9 35 02 BD D4 8D 39 BD D5 31 9F
34E0 15 BD D5 31 E6 84 C1 04 27 1B BD D4 82 97 0F C1
34F0 01 27 21 34 04 A1 E0 27 14 30 01 30 01 30 01 E6
3500 84 C1 04 26 EE 9E 15 BD D5 3A 39 20 E6 BD D5 35
3510 BD D5 3A 39 30 01 A1 84 25 0F 30 01 A1 84 22 D9
3520 9F 0C BD D5 2D BD D5 3A 39 30 01 20 CC 9E 0C 20
3530 04 9E 0C 30 01 30 01 9F 0C 39 AE 84 9F 0C 39 9E
3540 0C A6 09 34 02 A6 08 34 02 A6 07 34 02 A6 06 34
```

```
3550  02 A6 05 34 02 A6 04 34 02 30 01 30 01 BD D5 3A
3560  7E D4 7C 1F 41 AE 02 20 0A 1F 41 AE 04 20 04 1F
3570  41 AE 06 32 61 32 61 32 61 32 61 32 61 32 61 32
3580  61 32 61 9F 0C 39 8E 00 73 6F 84 30 01 8C 00 7B
3590  26 F7 7E D5 31 3E D5 9D 9F 25 7E D5 31 31 38 8E
35A0  00 73 86 F0 A7 84 96 25 A7 02 BD D4 B4 96 26 A7
35B0  03 BD D4 B4 BD D5 31 85 01 27 03 7E D5 3A 7E D5
35C0  31 86 F1 97 73 7E D5 31 8E 00 73 A6 01 8A 01 A7
35D0  01 7E D5 31 8E 00 73 A6 01 8A 02 A7 01 7E D5 31
35E0  8E 00 73 A6 06 8A 02 A7 06 7E D5 31 BD D5 31 A6
35F0  84 1F 89 4D BD D5 2D AB 84 8E 00 72 9F 71 99 72
3600  97 72 96 71 89 00 97 71 8E 00 0B 9F 7B 9E 7B A6
3610  84 30 1F 9F 7B 9E 71 A7 84 30 1F 9F 71 5A 2E FD
3620  7E D5 2D 9E 11 9F 23 8E 00 73 9F 71 C6 08 9E 71
3630  A6 84 30 01 9F 71 9E 23 A7 84 30 01 9F 23 5A 2E
3640  ED 7E D5 31 8E 00 73 86 04 AA 01 A7 01 7E D5 31
3650  8E 00 00 9F 7B 8E 00 73 9F 71 0F 1A C6 0C 9E 7B
3660  A6 84 5A 30 01 9F 7B 81 00 26 04 0C 1A 20 EF 81
3670  20 26 04 86 0D 20 22 81 2D 26 04 86 0E 20 1A 81
3680  30 26 04 86 0A 20 12 81 2F 26 04 86 0B 20 0A 81
3690  45 26 04 86 00 20 02 84 0F 9E 71 34 04 D0 1A C5
36A0  01 27 04 A7 02 20 0C 48 48 48 48 AA 02 A7 02 30
36B0  01 9F 71 35 04 5D 2E A6 D6 1A 5A C5 01 27 06 86
36C0  0C A7 02 20 03 86 C0 AA 02 A7 02 30 01 5D 2E EA
36D0  7E D5 31 86 F2 97 73 7E D5 31 8E 00 04 9F 7B A6
36E0  84 27 02 80 20 30 01 9F 7B 8E 00 75 48 48 49 69
36F0  84 30 01 8C 00 7B 26 F6 9E 7B 8C 00 0C 26 E0 7E
3700  D5 31 86 F3 97 73 7E D5 31 BD D5 31 A6 84 97 75
3710  7E D5 2D 86 F4 97 73 7E D5 31 96 0E 97 74 7E D5
3720  31 86 F8 97 73 7E D5 31 96 0E 97 76 7E D5 31 0F
3730  80 0F 81 86 01 97 82 7E D5 31 BD DC 28 8D 16 8D
3740  35 BD DD D1 BD DC D4 0A 1A 27 05 BD DC 28 20 F1
3750  0F 85 7E D4 38 9E 11 A6 03 84 0F 48 8E D7 8B 9F
3760  86 9B 87 97 87 96 86 89 00 97 86 9E 86 A6 84 97
3770  B0 A6 01 97 B4 39 9E 11 A6 06 84 0F BD D8 93 48
3780  E6 07 C4 0F 34 04 AB E0 97 1A 39 77 E0 88 10 E4
3790  10 70 A0 FD 00 CF 30 F1 70 37 90 18 60 98 80 BD
37A0  DC 28 8D 05 0F 85 7E D4 38 9E 11 86 40 E6 01 C5
37B0  01 27 02 8A 80 E6 02 C4 0F 34 04 AB E0 9E 9E A7
37C0  84 8E 00 B0 6F 84 30 01 8C 00 C0 26 F7 9E 11 A6
37D0  04 84 0F 8E 00 B0 A7 05 30 01 BD DD AB BD DD AB
37E0  BD DD AB 9E 11 A6 05 84 0F 8E 00 B0 A7 04 BD DD
37F0  AB BD DD AB BD DD 9E 11 A6 06 84 0F 8E 00 B0
3800  A7 04 6F 84 BD DD AB BD DD 9E 9E 11 A6 07 84 0F
3810  8E 00 B0 AB 05 A7 05 A6 01 89 00 A7 01 9E 9E 96
3820  B1 A7 04 96 B5 A7 08 39 8E 00 0C C6 0C 86 00 30
3830  1F A7 84 5A 2E F9 BD D5 31 39 96 0E 81 0D 27 12
3840  8E 00 00 A6 01 A7 84 30 01 8C 00 0B 26 F5 96 0E
3850  97 0B BD D5 31 39 4F 97 0F 97 10 8E 00 00 A6 09
3860  81 00 26 08 A6 0A 81 00 26 0E 27 15 80 30 8D 23
3870  8D 21 48 48 97 10 A6 0A 80 30 8D 17 48 9B 10 97
3880  10 A6 0B 80 30 99 10 97 10 96 0F 89 00 97 0F BD
3890  D5 31 39 1F 89 4D 48 48 34 04 AB E0 39 8E E2 00
38A0  86 F4 A7 84 30 01 86 30 A7 84 30 01 86 32 A7 84
38B0  30 01 86 00 A7 84 30 01 A7 84 30 01 86 32 A7 84
38C0  30 01 86 34 A7 84 30 01 86 32 A7 84 30 01 8C E5
38D0  20 26 CD 8E E2 00 9F 11 9F 13 6F 84 BD D5 31 39
38E0  96 10 D6 0F 48 48 59 48 59 8B 00 97 12 C9 E2 D7
38F0  11 BD D5 31 39 96 13 91 11 22 36 25 06 96 14 91
3900  12 22 2E 86 F4 9E 13 A7 84 86 30 A7 01 86 32 A7
3910  02 86 00 A7 03 A7 04 86 32 A7 05 A7 07 86 34 A7
3920  06 96 12 8B 08 97 14 96 11 89 00 97 13 9E 13 6F
3930  84 BD D5 31 39 0F 80 0F 81 0F 82 7E D5 31 8E 00
3940  06 8D 15 97 80 30 01 30 01 8D 0D 97 81 30 01 8D
3950  01 8D 05 97 82 7E D5 31 A6 84 84 0F E6 01 C4 0F
3960  48 48 48 48 34 04 AB E0 39 BD DC 28 BD D9 8C BD
3970  DA 08 BD DA 8D BD DA A6 BD DA DF BD D9 C7 BD DC
3980  28 BD D9 DC BD DB 74 0F 85 7E D4 38 7F 01 60 8E
3990  01 54 BF 01 50 9E 11 30 01 BF 01 52 A6 84 81 04
39A0  26 05 86 40 B7 01 60 BE 01 52 A6 01 BE 01 50 A7
```

```
39B0 84 30 01 8C 01 5A 27 0E BF 01 50 BE 01 52 30 01
39C0 BF 01 52 7E D9 A7 39 86 42 0D B0 2B 02 8A 80 9E
39D0 9E A7 84 86 02 9B 85 A7 08 6F 04 39 8E 00 B0 BF
39E0 01 40 9E 88 BF 01 42 BE 01 40 A6 84 BE 01 42 A7
39F0 84 A7 01 7C 01 41 BE 01 40 8C 00 BF 27 09 7C 01
3A00 43 7C 01 43 7E D9 E7 39 8E 01 5A 6F 84 30 01 8C
3A10 01 60 26 F7 30 01 6F 84 8E 01 54 A6 84 A7 06 48
3A20 69 07 30 01 A6 84 48 69 07 AB 06 A7 06 48 69 07
3A30 30 01 A6 84 48 69 07 48 69 07 AB 06 A7 06 48 69
3A40 07 30 01 A6 84 48 48 48 AB 06 A7 06 8E 01 59 A6
3A50 84 44 66 06 44 66 06 66 06 AB 07 A7 07 30 1F A6
3A60 84 44 66 06 44 66 06 44 66 06 66 06 AB 07 A7 07
3A70 30 1F A6 84 44 44 44 44 AB 07 A7 07 8E 01 5A A6
3A80 84 84 7F A7 84 30 01 8C 01 5E 26 F3 39 5F 4F 8E
3A90 01 5B A6 84 BB 01 5A 30 01 AB 84 5C C1 06 26 F7
3AA0 84 7F B7 01 61 39 8E 01 5A BF 01 46 7F 01 48 7F
3AB0 01 49 5F 8E DB 81 BF 01 48 BE 01 46 A6 84 BB 01
3AC0 49 B7 01 49 F9 01 48 F7 01 48 BE 01 48 A6 84 BE
3AD0 01 46 A7 08 30 01 BF 01 46 8C 01 6A 26 D4 39 8E
3AE0 00 B0 6F 84 30 01 8C 00 BF 26 F7 8E 00 B0 BF 01
3AF0 4A C6 01 F7 01 4C 8E 01 5A C6 80 F7 01 4D A6 84
3B00 B4 01 4C 27 10 BF 01 4E BE 01 4A F6 01 4D EB 84
3B10 E7 84 BE 01 4E 30 01 74 01 4D 7D 01 4D 26 DF 7D
3B20 01 4C 2B 0E BE 01 4A 30 01 BF 01 4A 78 01 4C 7E
3B30 DA F6 86 01 B7 01 4C 8E 01 62 86 80 B7 01 4D A6
3B40 84 B4 01 4C 27 10 BF 01 4E BE 01 4A F6 01 4D EB
3B50 84 E7 84 BE 01 4E 30 01 74 01 4D 7D 01 4D 26 DF
3B60 7D 01 4C 2B 0E BE 01 4A 30 01 BF 01 4A 78 01 4C
3B70 7E DB 37 39 86 20 9E 9E A7 84 86 F0 A7 03 6F 04
3B80 39 00 17 2E 39 5C 4B 72 65 B9 AF 96 81 E4 F3 CA
3B90 DD 67 70 49 5E 3B 2C 15 02 DF C8 F1 E6 83 94 AD
3BA0 BA CE D9 E0 F7 92 85 BC AB 76 61 58 4F 2A 3D 04
3BB0 13 A9 BE 87 90 F5 E2 DB CC 11 06 3F 28 4D 5A 63
3BC0 74 8B 9C A5 B2 D7 C0 F9 EE 33 24 1D 0A 6F 78 41
3BD0 56 EC FB C2 D5 B0 A7 9E 89 54 43 7A 6D 08 1F 26
3BE0 31 45 52 6B 7C 19 0E 37 20 FD EA D3 C4 A1 B6 8F
3BF0 98 22 35 0C 1B 7E 69 50 47 9A 8D B4 A3 C6 D1 E8
3C00 FF 8D 25 BD DC 57 BD DC 8D 8D 1D BD DC A6 BD DC
3C10 D4 8D 15 BD DD 1D BD DD 3E 8D 0D BD DD D1 BD DC
3C20 D4 86 00 97 85 7E D4 38 9E 9E 30 01 8C 00 94 26
3C30 03 8E 00 90 9F 9E 8E 00 C0 9F 88 96 9F 80 90 48
3C40 48 48 48 48 9B 89 97 89 96 88 89 00 97 88 9E 9E
3C50 A6 04 AA 08 26 FA 39 9E 11 A6 04 84 0F BD D8 93
3C60 48 E6 05 C4 0F 34 04 AB E0 1F 89 4D 54 24 06 C6
3C70 80 DA 83 20 04 C6 7F D4 83 D7 83 8E DE 06 9F 8E
3C80 84 FE 9B 8F 97 8F 96 8E 89 00 8F 8E 39 86 42 9E
3C90 8E E6 84 D8 83 2A 02 8A 80 9E 9E A7 84 86 38 9B
3CA0 85 A7 08 6F 04 39 86 10 9E 9E A7 84 86 5C A7 08
3CB0 6F 04 9E 8E A6 84 9E 88 0D 83 2A 01 43 A7 84 A7
3CC0 01 9E 8E A6 01 9E 88 0D 83 2A 02 88 F0 A7 04 A7
3CD0 05 6F 09 39 C6 0C 8E DD EE 9F 86 9E 88 68 04 69
3CE0 84 24 14 9E 86 A6 84 9F 82 A8 05 A7 05 9E 86 A6
3CF0 01 9E 88 A8 09 A7 09 9E 86 30 01 30 01 9F 86 5A
3D00 2E D9 9E 88 A6 01 A7 84 A7 02 A7 03 A6 05 A7 04
3D10 A7 06 A7 07 A6 09 A7 08 A7 0A A7 0B 39 8E 00 B0
3D20 6F 84 30 01 8C 00 C0 26 F7 9E 11 A6 02 84 0F 8E
3D30 00 B0 A7 05 30 01 BD DD AB BD DD AB BD DD AB 9E
3D40 11 A6 03 84 0F 8E 00 B0 A7 04 8D 5F 8D 5D 8D 4E
3D50 9E 11 A6 06 84 0F 8E 00 B0 A7 04 6F 84 8D 4C 8D
3D60 3D 9E 11 A6 07 84 0F 8E 00 B0 AB 05 A7 05 A6 01
3D70 89 00 A7 01 68 05 69 01 68 05 69 01 68 05 69 01
3D80 A6 05 85 08 27 04 63 01 88 F0 84 F0 A7 05 C6 0C
3D90 6F 84 69 05 69 01 66 84 66 04 5A 2E F5 39 A6 04
3DA0 AB 05 A7 05 A6 84 A9 01 A7 01 39 A6 04 E6 84 48
3DB0 59 48 59 AB 04 E9 84 48 59 A7 04 E7 84 39 86 42
3DC0 0D B0 2B 02 8A 80 9E 9E A7 84 86 02 A7 08 6F 04
3DD0 39 9E 86 10 A7 84 86 5C A7 08 6F 04 9E 88 96
3DE0 30 A7 84 A7 01 96 B4 A7 04 A7 05 6F 09 39 0A E2
3DF0 3F 92 0D 2A 0C 76 0C D8 06 6C 03 36 0B 78 05 BC
```

```
3E00 02 DE 0B 8C 05 C6 93 40 C0 50 11 D0 D6 A0 54 60
3E10 35 60 5A 50 CB 60 28 50 06 A0 21 50 1D 40 C1 60
3E20 1B 70 07 30 06 B0 16 A0 D0 70 36 C0 2C 30 B7 10
3E30 0C 50 C1 C0 26 70 9C 30 32 10 E0 A0 1C 50 F6 60
3E40 09 30 EE 80 0B 20 10 D0 0C E0 19 80 EC 30 DC B0
3E50 4E C0 31 B0 C3 30 E4 60 E1 B0 0A 30 30 50 27 20
3E60 04 50 08 60 C2 C0 05 A0 05 00 B6 90 02 84 FE 8A
3E70 02 D6 84 C4 01 34 04 AB E0 D6 83 C5 20 27 02 88
3E80 01 B7 90 02 F6 EC 19 BE EC 1C 9E 9C F6 08 C0 01
3E90 E7 08 E6 04 C2 00 E7 04 84 FD B7 90 02 EA 08 27
3EA0 07 9E A0 AE 88 10 6E 84 86 00 A7 84 30 01 8C 00
3EB0 94 26 03 8E 00 90 9F 9C A6 84 84 70 44 44 44 8E
3EC0 DE D4 9F A0 9B A1 97 A1 96 A0 89 00 97 A0 9E A0
3ED0 AE 84 6E 84 DE F4 DE F5 DF 14 DF 14 DF 37 00 00
3EE0 00 00 00 00 DE F4 DF 4B DF 69 DF 69 DF 99 00 00
3EF0 00 00 00 00 3B 8E 00 C0 9F 8A 96 9D 80 90 48 48
3F00 48 48 48 9B 8B 97 8B 97 8D 96 8A 89 00 97 8A 97
3F10 8C 7E DE A1 8E 00 C0 9F 8A 96 9D 80 90 48 48 48
3F20 48 48 9B 8B 97 8B 96 8A 89 00 97 8A 86 80 B7 01
3F30 44 7F 01 45 7E DE A1 9E 9C A6 84 84 0F 97 A2 97
3F40 A3 A6 84 84 80 40 09 84 7E DE A1 9E 8A 68 08 69
3F50 04 69 84 09 84 30 01 96 8D 8B 04 D6 8B 5C 34 04
3F60 A1 E0 26 02 9E 8C 9F 8A 3B 9E 8A 7D 01 44 2B 0C
3F70 68 01 09 84 86 80 B7 01 44 7E DF 83 68 84 09 84
3F80 7F 01 44 7C 01 45 B6 01 45 81 10 26 0B 7F 01 45
3F90 9E 8A 30 01 30 01 9F 8A 3B 0D A3 26 06 96 A2 97
3FA0 A3 03 84 0A A3 3B 00 00 00 00 00 00 00 00 00 00
3FB0 00 00 00 00 00 00 00 00 00 00 00 00 00 00 00 00
3FC0 00 00 00 00 00 00 00 00 00 00 00 00 00 00 00 00
3FD0 00 00 00 00 00 00 00 00 00 00 00 00 00 00 00 00
3FE0 00 00 00 00 00 00 00 00 00 00 00 00 00 00 00 00
3FF0 00 00 00 00 00 00 00 00 00 00 00 00 00 00 00 00
4000 00 00 00 00 00 00 00 00 00 00 00 00 00 00 00 00
4010 00 00 00 00 00 00 00 00 00 00 00 00 00 00 00 00
4020 00 00 00 00 00 00 00 00 00 00 00 00 00 00 00 00
4030 00 00 00 00 00 00 00 00 00 00 00 00 00 00 00 00
4040 00 00 00 00 00 00 00 00 00 00 00 00 00 00 00 00
4050 00 00 00 00 00 00 00 00 00 00 00 00 00 00 00 00
4060 00 00 00 00 00 00 00 00 00 00 00 00 00 00 00 00
4070 00 00 00 00 00 00 00 00 00 00 00 00 00 00 00 00
4080 00 00 00 00 00 00 00 00 00 00 00 00 00 00 00 00
4090 00 00 00 00 00 00 00 00 00 00 00 00 00 00 00 00
40A0 00 00 00 00 00 00 00 00 00 00 00 00 00 00 00 00
40B0 00 00 00 00 00 00 00 00 00 00 00 00 00 00 00 00
40C0 00 00 00 00 00 00 00 00 00 00 00 00 00 00 00 00
40D0 00 00 00 00 00 00 00 00 00 00 00 00 00 00 00 00
40E0 00 00 00 00 00 00 00 00 00 00 00 00 00 00 00 00
40F0 00 00 00 00 00 00 00 00 00 00 00 00 00 00 00 00
4100 00 00 00 00 00 00 00 00 00 00 00 00 00 00 00 00
4110 00 00 00 00 00 00 00 00 00 00 00 00 00 00 00 00
5000 0D 0A 0A 0A 45 43 48 4F 20 54 45 53 54 20 45 4E
5010 43 4F 44 45 52 0D 0A 4D 4F 54 4F 52 4F 4C 41 20
5020 20 20 4A 41 4E 20 31 39 38 31 04 0D 0A 0A 55 4E
5030 46 4F 52 4D 41 54 54 45 44 20 53 59 53 54 45 4D
5040 2E 04 0D 0A 0A 45 4E 54 45 52 20 41 20 42 4C 4F
5050 43 4B 20 50 4F 53 49 54 49 4F 4E 20 46 52 4F 4D
5060 20 30 20 54 4F 20 39 39 3A 20 04 0D 0A 20 20 42
5070 4C 4F 43 4B 20 55 4E 44 45 46 49 4E 45 44 2E 04
5080 0D 0A 42 4C 4F 43 4B 20 04 0D 0A 20 20 41 44 44
5090 52 45 53 53 20 43 41 50 20 43 4F 44 45 20 3D 20
50A0 04 0D 0A 20 20 45 52 52 4F 52 53 20 49 4E 43 4C
50B0 55 44 45 44 20 49 4E 20 57 4F 52 44 20 31 2E 04
50C0 0D 0A 20 20 45 52 52 4F 52 53 20 49 4E 45 43 4C
50D0 44 45 44 20 49 4E 20 57 4F 52 44 20 32 2E 04 0D
50E0 0A 04 0D 0A 20 20 53 51 55 41 52 45 20 57 41 56
50F0 45 20 4F 46 20 04 36 30 30 20 48 5A 04 33 30 30
5100 20 48 5A 04 31 35 30 20 48 5A 04 37 35 20 48 5A
5110 04 49 4C 4C 45 47 41 4C 04 20 45 52 45 51 55 45
5120 4E 43 59 2E 04 0D 0A 20 20 53 54 41 52 54 49 4E
5130 47 20 50 4F 4C 41 52 49 54 59 20 3D 20 04 0D 0A
```

```
5140  20 20 42 4C 4F 43 4B 20 44 55 52 41 54 49 4F 4E
5150  20 3D 20 04 20 53 41 4D 50 4C 45 53 2E 04 0D 0A
5160  20 20 53 59 4E 43 20 3D 20 04 20 20 20 49 4E 56
5170  45 52 54 45 44 2E 04 0D 0A 20 20 45 52 52 4F 52
5180  53 20 49 4E 43 4C 55 44 45 44 2E 04 0D 0A 20 20
5190  47 52 4F 55 50 20 49 44 20 3D 20 04 4E 4F 4E 45
51A0  2E 04 0D 0A 20 20 4E 55 4D 20 44 45 53 49 47 20
51B0  54 41 20 3D 20 04 0D 0A 20 20 4D 45 53 53 41 47
51C0  45 20 43 4F 4E 54 49 4E 55 45 44 20 49 4E 20 4E
51D0  45 58 54 20 42 4C 4F 43 4B 2E 04 0D 0A 20 20 41
51E0  4C 50 48 41 2D 04 0D 0A 20 20 50 53 45 55 44 4F
51F0  2D 52 41 4E 44 4F 4D 20 53 45 51 55 45 4E 43 45
5200  2E 04 0D 0A 20 20 53 45 45 44 20 42 59 54 45 20
5210  3D 20 04 0D 0A 20 20 4C 4F 47 49 43 20 4C 45 56
5220  45 4C 20 3D 20 04 0D 0A 20 20 53 41 4D 50 4C 45
5230  20 53 54 52 49 4E 47 2E 04 0D 0A 20 20 50 52 45
5240  41 4D 42 4C 45 20 57 4F 52 44 20 3D 20 20 04 0D
5250  0A 20 20 4E 55 4D 42 45 52 20 4F 46 20 53 45 51
5260  55 45 4E 54 49 41 4C 20 50 52 45 41 4D 42 4C 45
5270  20 57 4F 52 44 53 20 3D 20 04 0D 0A 20 20 45 52
5280  52 4F 52 53 20 49 4E 43 4C 55 44 45 44 20 49 4E
5290  20 45 41 43 48 20 50 52 45 41 4D 42 4C 45 20 57
52A0  4F 52 44 2E 04 0D 0A 20 20 53 49 4E 47 4C 45 20
52B0  45 43 48 4F 20 57 4F 52 44 20 3D 20 04 0D 0A 20
52C0  20 43 48 41 4E 47 45 20 28 59 2F 4E 29 3F 20 04
52D0  0D 0A 0A 20 20 53 45 4C 45 43 54 3A 0D 0A 20 20
52E0  20 31 20 2D 20 41 44 44 52 45 53 53 20 43 45 4C
52F0  4C 2E 0D 0A 20 20 20 32 20 2D 20 4E 55 4D 45 52
5300  49 43 20 44 41 54 41 20 43 45 4C 4C 2E 0D 0A 20
5310  20 20 33 20 2D 20 50 52 45 41 4D 42 4C 45 2E 0D
5320  0A 20 20 20 34 20 2D 20 53 51 55 41 52 45 20 57
5330  41 56 45 2E 0D 0A 04 0D 0A 20 20 20 3F 20 04 0D
5340  0A 0A 20 20 53 59 4E 43 20 57 4F 52 44 20 3D 20
5350  04 2E 04 0D 0A 20 20 49 4E 43 4C 55 44 45 20 45
5360  52 52 4F 52 53 20 28 59 2F 4E 29 3F 20 04 0D 0A
5370  20 20 45 4E 54 45 52 20 47 52 4F 55 50 20 49 44
5380  20 57 4F 52 44 20 28 31 20 44 49 47 49 54 29 3A
5390  20 04 0D 0A 20 20 49 4E 56 45 52 54 20 28 59 2F
53A0  4E 29 3F 20 04 0D 0A 20 20 45 4E 54 45 52 20 41
53B0  44 44 52 45 53 53 20 43 41 4C 50 20 4F 43 44 20
53C0  28 36 20 44 49 47 49 54 53 29 3A 20 04 0D 0A 20
53D0  20 49 4E 43 4C 55 44 45 20 45 52 52 4F 52 53 20
53E0  49 4E 20 45 43 48 4F 20 57 4F 52 44 20 31 20 28
53F0  59 2F 4E 29 3F 20 04 0D 0A 20 20 49 4E 43 4C 55
5400  44 45 20 45 52 52 4F 52 53 20 49 4E 20 45 43 48
5410  4F 20 57 4F 52 44 20 32 20 28 59 2F 4E 29 3F 20
5420  04 0D 0A 20 20 45 4E 54 45 52 20 4E 55 4D 45 52
5430  49 43 20 44 41 54 41 20 4D 45 53 53 41 47 45 20
5440  28 55 50 20 54 4F 20 31 32 20 44 49 47 49 54 53
5450  2C 20 53 50 41 43 45 53 2C 20 2D 27 53 2C 20 45
5460  27 53 2C 20 41 4E 44 20 2F 27 53 29 3A 20 0D 0A
5470  20 20 20 20 20 04 0D 0A 20 20 49 53 20 4D 45 53
5480  53 41 47 45 20 43 4F 4E 54 49 4E 55 45 44 20 49
5490  4E 20 4E 45 58 54 20 42 4C 4F 43 4B 20 28 59 2F
54A0  4E 29 3F 20 04 0D 0A 20 20 4D 45 53 53 41 47 45
54B0  20 43 4F 4E 54 49 4E 55 45 44 20 49 4E 20 4E 45
54C0  58 54 20 42 4C 4F 43 4B 2E 04 0D 0A 20 20 45 4E
54D0  54 45 52 20 41 4C 50 48 41 2D 4E 55 4D 45 52 49
54E0  43 20 44 41 54 41 20 4D 45 53 53 41 47 45 20 28
54F0  55 50 20 54 4F 20 38 20 43 48 41 52 41 43 54 45
5500  52 53 29 3A 20 0D 0A 20 20 20 20 04 0D 0A 20
5510  20 45 4E 54 45 52 20 53 51 55 41 52 45 20 57 41
5520  56 45 20 53 54 41 52 54 49 4E 47 20 50 4F 4C 41
5530  52 49 54 59 20 28 30 20 4F 52 20 31 29 3A 20 04
5540  0D 0A 20 20 53 54 41 52 54 49 4E 47 20 50 4F 4C
5550  41 52 49 54 59 20 45 4E 54 45 52 45 44 2E 04 0D
5560  0A 20 20 53 45 4C 45 43 54 20 53 51 55 41 52 45
5570  20 57 41 56 45 20 46 52 51 55 45 4E 43 59 3A
5580  20 0D 0A 20 20 20 31 20 2D 20 36 30 30 20 48 5A
5590  2E 0D 0A 20 20 20 32 20 2D 20 33 30 30 20 48 5A
```

```
5540  2E 0D 0A 20 20 20 33 20 2D 20 31 35 30 20 48 5A
55B0  2E 0D 0A 20 20 20 34 20 2D 20 20 37 35 20 48 5A
55C0  2E 0D 0A 04 0D 0A 20 20 46 52 45 51 55 45 4E 43
55D0  59 20 45 4E 54 45 52 45 44 2E 04 0D 0A 20 45 4E
55E0  54 45 52 20 53 51 55 41 52 45 20 57 41 56 45 20
55F0  44 55 52 41 54 49 4F 4E 20 49 4E 20 20 53 41 4D
5600  50 4C 45 53 20 28 31 2D 36 35 35 33 35 29 3A 0D
5610  0A 20 20 20 20 20 04 0D 0A 20 20 45 4E 54 45 52
5620  20 50 52 45 41 4D 42 4C 45 20 45 43 48 4F 20 57
5630  4F 52 44 20 28 31 20 44 49 47 49 54 29 3A 20 04
5640  0D 0A 20 20 50 52 45 41 4D 42 4C 45 20 57 4F 52
5650  44 20 45 4E 54 45 52 45 44 2E 04 0D 0A 20 20 45
5660  4E 54 45 52 20 4E 55 4D 42 45 52 20 4F 46 20 50
5670  52 45 41 4D 42 4C 45 20 45 43 48 4F 20 57 4F 52
5680  44 53 20 44 45 53 49 52 45 44 0D 0A 20 20 28 31
5690  2D 32 35 35 29 3A 20 04 0D 0A 20 20 4E 55 4D 42
56A0  45 52 20 4F 46 20 50 52 45 41 4D 42 4C 45 20 57
56B0  4F 52 44 53 20 45 4E 54 45 52 45 44 2E 04 0D 0A
56C0  20 20 49 4E 43 4C 55 44 45 20 45 52 52 4F 52 53
56D0  20 49 4E 20 45 41 43 48 20 45 43 48 4F 20 57 4F
56E0  52 44 20 28 59 2F 4E 29 3F 20 04 0D 0A 20 20 45
56F0  52 52 4F 52 53 20 49 4E 43 4C 55 44 45 44 20 49
5700  4E 20 45 41 43 48 20 50 52 45 41 4D 42 4C 45 20
5710  45 43 48 4F 20 57 4F 52 44 2E 04 0D 0A 0A 20 53
5720  45 4C 45 43 54 3A 0D 0A 20 20 20 30 20 2D 20 43 4F
5730  4E 54 52 4F 4C 20 4D 55 4C 54 49 50 4C 45 20 54
5740  52 41 4E 53 4D 49 53 53 49 4F 4E 53 2E 0D 0A 20
5750  20 31 20 2D 20 54 52 41 4E 53 4D 49 54 20 31 20
5760  51 55 45 55 45 2E 0D 0A 20 20 32 20 2D 20 50 52
5770  4F 47 52 41 4D 20 51 55 45 55 45 20 42 4C 4F 43
5780  4B 53 2E 0D 0A 04 0D 0A 0A 20 45 4E 54 45 52 20
5790  4E 55 4D 42 45 52 20 4F 46 20 54 49 4D 45 53 20
57A0  51 55 45 55 45 20 49 53 20 54 4F 20 42 45 20 54
57B0  52 41 4E 53 4D 49 54 54 45 44 0D 0A 20 28 31 2D
57C0  39 39 39 39 39 29 3A 20 04 0D 0A 0A 20 57 48
57D0  45 4E 20 52 45 41 44 59 20 54 4F 20 54 52 41 4E
57E0  53 4D 49 54 2C 20 54 59 50 45 20 27 47 27 2E 0D
57F0  0A 20 57 41 49 54 49 4E 47 3A 20 04 0D 0A 0A 20
5800  54 52 41 4E 53 4D 49 53 53 49 4F 4E 20 43 4F 4D
5810  50 4C 45 54 45 2E 0D 0A 04 0D 0A 0A 20 20 2A 20
5820  4D 45 4E 55 20 49 4E 43 4F 4D 50 4C 45 54 45 20
5830  2A 0D 0A 04 D4 9C F0 00 D4 DC F8 43 04 D5 63 D5
5840  69 D5 6F D4 9C F0 2B D5 95 D8 9D D4 9C F7 1B D4
5850  9C F3 37 D4 DC F8 4B 30 FB 27 31 FB 87 32 F8 61
5860  04 D4 9C F0 42 D8 28 D4 DC F8 61 01 30 39 F8 74
5870  0D F8 4B 04 D8 3A D4 DC F8 61 01 30 39 F8 83 0D
5880  F8 83 04 D8 3A D8 56 D8 E0 D8 F5 D0 00 D4 9C F2
5890  BD D4 DC F8 8D 59 F8 9C 4E F8 61 04 D4 9C F2 D0
58A0  D4 9C F3 37 D4 DC F8 9C 31 F8 B5 32 F8 BF 33 F8
58B0  C9 34 F8 D3 04 D5 3F F8 E1 00 F8 61 F8 9C D5
58C0  3F F9 41 00 00 F8 61 F8 9C D5 3F FA 69 00 00 F8
58D0  61 F8 9C D5 3F FA 05 00 00 F8 61 F8 9C D6 23 D5
58E0  69 D5 3F F8 EB F8 E1 F9 04 F8 41 D4 9C F3 A5 D8
58F0  28 D5 86 D4 DC F8 3D 01 30 39 F9 00 0D F8 41 04
5900  D8 3A D5 69 D5 3F F8 F3 F8 E1 F9 0E F8 E1 D5 3F
5910  F8 F3 F8 E1 F9 18 F8 E1 D5 3F F8 F3 F8 E1 F9 22
5920  F8 E1 D5 3F F8 F3 F8 E1 F9 2C F8 E1 D5 3F F8 F3
5930  F8 E1 F9 36 F8 E1 D5 EC 06 02 D5 C1 D4 DC F8 DD
5940  04 D5 3F F9 4B F9 41 F9 6C F8 41 D4 9C F4 21 D8
5950  28 D5 85 D4 DC F8 3D 01 30 39 F9 00 20 F9 00 2D
5960  F9 00 45 F9 00 2F F9 00 0D F8 41 04 D5 3F F9 53
5970  F9 41 F9 76 F9 DA D5 3F F9 53 F9 41 F9 80 F9 DA
5980  D5 3F F9 53 F9 41 F9 8A F9 DA D5 3F F9 53 F9 41
5990  F9 94 F9 DA D5 3F F9 53 F9 41 F9 9E F9 DA D5 3F
59A0  F9 53 F9 41 F9 A8 F9 DA D5 3F F9 53 F9 41 F9 B2
59B0  F9 DA D5 3F F9 53 F9 41 F9 BC F9 DA D5 3F F9 53
59C0  F9 41 F9 C6 F9 DA D5 3F F9 53 F9 41 F9 D0 F9 DA
59D0  D5 3F F9 53 F9 41 F9 DA F9 DA D6 50 D6 D3 D5 3F
59E0  F9 E8 00 00 F8 3F F9 41 D4 9C F4 76 D4 DC F9 E8
59F0  59 F9 FA 4E F8 DD 0D F8 41 04 D6 44 D4 9C F4 A5
```

```
5A00  D4 DC F8 DD 24 D4 9C F5 0D D4 DC FA 05 01 30 31
5A10  FA 16 0D F8 41 04 D7 13 D7 1A D4 9C F5 40 D4 9C
5A20  F5 5F D4 9C F3 37 D4 DC FA 1E 31 FA 3A 32 FA 42
5A30  33 FA 4A 34 FA 52 0D F8 41 04 D7 09 31 D4 DC FA
5A40  55 04 D7 09 32 D4 DC FA 55 04 D7 09 34 D4 DC FA
5A50  55 04 D7 09 38 D4 9C F5 C4 D4 9C F5 DB D8 28 D5
5A60  3F FA A6 FA 59 F8 DD 00 00 D8 28 D5 86 D4 9C F6
5A70  17 D4 DC FA 69 01 30 39 FA 7E 0D F8 41 04 D7 21
5A80  D7 28 D4 9C F6 40 D4 9C F6 5B D5 3F FA E8 FA 86
5A90  FA 94 FA 69 D4 9C F6 98 D4 DC F8 DD 04 D4 9C F8
5AA0  19 D4 DC F8 43 04 D5 3F FA B0 F8 3D F8 3F 00 00
5AB0  D5 3F FB 16 F8 3D FA BA FA E2 D5 3F FB 16 F8 3D
5AC0  FA C4 FA E2 D5 3F FB 16 F8 3D FA CE FA E2 D5 3F
5AD0  FB 16 F8 3D FA D8 FA E2 D5 3F FB 16 F8 3D FA E2
5AE0  FA E2 D5 EC 05 03 D5 69 D5 3F FA F2 F8 3D F8 3F
5AF0  00 00 D5 3F FB 16 F8 3D FA FC FB 10 D5 3F FB 16
5B00  F8 3D FB 26 FB 10 D5 3F FB 16 F8 3D FB 10 FB 10
5B10  D5 EC 03 05 D5 69 D4 DC F8 3D 01 30 39 FB 23 0D
5B20  F8 41 04 D8 3A D5 69 D8 28 D9 35 D4 9C F7 86 D4
5B30  DC FB 27 01 30 39 FB 3C 0D F8 43 04 D8 3A D4 DC
5B40  FB 27 01 30 39 FB 43 0D FB 90 04 D8 3A D4 DC FB
5B50  27 01 30 39 FB 5A 0D FB 90 04 D8 3A D4 DC FB 27
5B60  01 30 39 FB 69 0D FB 90 04 D8 3A D4 DC FB 27 01
5B70  30 39 FB 78 0D FB 90 04 D8 3A D4 DC FB 27 01 30
5B80  39 FB 8E 0D FB 90 04 D7 2F D4 DC FB 92 04 D8 3A
5B90  D9 3E D4 9C F7 CA D4 DC FB 8E 47 FB 9E 04 D3 97
5BA0  D4 9C F7 FC D4 DC F8 4B 04 00 00 00 00 00 00 00
5BB0  00 00 00 00 00 00 00 00 00 00 00 00 00 00 00 00
5BC0  00 00 00 00 00 00 00 00 00 00 00 00 00 00 00 00
5BD0  00 00 00 00 00 00 00 00 00 00 00 00 00 00 00 00
5BE0  00 00 00 00 00 00 00 00 00 00 00 00 00 00 00 00
5BF0  00 00 00 00 00 00 00 00 00 00 00 00 00 00 00 00
```

We claim:

1. A method of encoding information signals including a receiver address, for transmission of information to a plural population of receivers, each said receiver being capable of selectively establishing more than one time period for address correlation and having a predetermined alert sequence, comprising the steps of:
   generating a first set of coded signals to establish one of at least a first and second time period for said plural population of receivers to correlate for an address;
   generating a second set of coded signals to select at least one selected receiver of said plural receiver population.

2. A method of encoding, according to claim 1, further comprising the step of:
   generating a first activation code signal subsequent to said second set of coded signals for activating the predetermined alert sequence of said at least one selected receiver.

3. A method of encoding, according to claim 2, further comprising the step of:
   generating additional said first and second sets of coded signals for at least one selected other receiver of said plural receiver population during the duration of said predetermined alert sequence of said at least one selected receiver.

4. A method of encoding, according to claim 1, wherein said step of generating a first set of coded signals includes the steps of:
   generating one of a preamble signal and an inverted preamble signal thereby selecting one of the first and second time periods, respectively, of said at least one selected receiver.

5. A method of encoding, according to claim 4, wherein:
   selecting said first time period causes at least one selected receiver to correlate only one said second set of coded signals, and
   selecting said second time period causes said at least one selected receiver to correlate a plurality of second sets of coded signals.

6. A method of encoding, according to claim 1, further comprising the steps of:
   generating a third set of coded signals for causing said at least one selected receiver to continue to correlate for an address; and
   generating at least one additional second set of coded signals for selecting at least one selected other receiver of said plural receiver population.

7. A method of encoding information signals including a receiver address for transmission of information to a plural population of receivers, each said receiver being capable of selectively establishing more than one time period for address correlation and having a predetermined alert sequence, comprising the steps of:
   generating a first set of coded signals for selecting at least one selected receiver of said plural receiver population;
   generating a first activation code signal subsequent to said first set of coded signals for activating the predetermined alert sequence of said at least one selected receiver;
   generating at least a second set of coded signals for selecting at least one other selected receiver of said plural receiver population during the duration of said predetermined alert sequence of said at least one selected receiver.

8. A method for encoding information signals including a receiver address for transmission of information to a plural population of receivers, each said receiver having a predetermined alert sequence, comprising the steps of:

generating coded signals for selecting at least one selected receiver of said plural receiver population; and generating a first activation code signal subsequent to said coded signals for activating the predetermined alert sequence of said at least one selected receiver.

9. An encoding device for generating sequential code signals containing information which are to be transmitted to a plural population of receivers, each said receiver being capable of establishing more than one time period for address correlation and having predetermined alert sequence, comprising:

means for generating a first set of coded signals for selecting one of at least a first and second time period for said plural population of receivers to correlate for an address;

means for generating a second set of coded signals for selecting at least one selected receiver of said plural receiver population.

10. An encoding device, according to claim 9, further comprising:

means for generating a first activation code signal subsequent to said second set of coded signals for activating the predetermined alert sequence of said at least one selected receiver.

11. An encoding device, according to claim 10, further comprising:

means for generating additional first and second sets of coded signals for at least one selected other receiver of said plural receiver population during the duration of said predetermined alert sequence of said at least one selected receiver.

12. An encoding device, according to claim 11, wherein:

said means for generating a first set of coded signals generates one of a preamble and an inverted preamble to select one of the first and second time periods, respectively, of said at least one selected receiver.

13. An encoding device for generating sequential code signals containing information which are to be transmitted to a plural population of receivers, each said receiver having a predetermined alert sequence, comprising:

means for generating coded signals for selecting at least one selected receiver of said plural receiver population;

means for generating a first activation code signal subsequent to said coded signals for activating a predetermined alert sequence of said at least one selected receiver.

14. An encoding device for generating sequential code signals which are to be transmitted to a plural population of receivers, each said receiver having predetermined alert sequence, comprising:

means for generating a first set of coded signals for selecting at least one selected receiver of said plural receiver population;

means for generating a first activation code signal subsequent to said first set of coded signals for activating the predetermined alert sequence of said at least one selected receiver; and means for generating at least a second set of coded signals for selecting at least one selected other receiver of said plural receiver population during the duration of said predetermined alert sequence of said at least one selected receiver.

15. An encoding device for generating sequential code signals containing information which are to be transmitted to a plural population of receivers, each said receiver capable of selectively establishing more than one time period for address correlation and having a predetermined alert sequence, comprising:

selecting means for storing and selecting the code signals to be transmitted, said code signals including a first set of coded signals to select one of at least a first and second time period for said plural population of receivers to correlate at least one address, a second set of coded signals to address at least one selected receiver of said plural receiver population, and a first activation code signal for activating the predetermined alert sequence of said at least one selected receiver;

transmitter means, connected to said selecting means, for transmitting said selected code signals;

control circuit means, connected to said selecting means and said transmitter means, for enabling said selecting means to generate a selected first set of coded signals to select one of at least a first and second time period for said plural population of receivers to correlate at least one address, for enabling said selecting means to generate a selected second set of coded signals to address at least one selected receiver of said plural receiver population, for enabling said selecting means to generate a first activation code signal subsequent to said selected second set of coded signals for activating the predetermined alert sequence of said at least one selected receiver, for enabling said selecting means to generate additional selected first and second sets of code signals for at least one other selected receiver, and for enabling said selecting means to generate at least an additional selected second set of coded signals to address at least one selected other receiver of said plural receiver population during the duration of said predetermined alert sequence of said at least one selected receiver, in accordance with said selecting means.

16. An encoding device, according to claim 15, further comprising:

a voice receiving means, connected to said transmitter means and said control circuit means, for receiving and storing a voice message;

said control circuit means for further controlling the sequence of transmission of said voice message and said code signals.

17. An encoding device, according to claim 16, wherein said selecting means further comprises:

a keyboard having selection keys and a page control key;

a keyboard decoder, connected to said keyboard, for decoding signals from said keyboard;

a word file memory, connected to said keyboard decoder and said control circuit means, for storing and generating coded signals in response to said keyboard decoder and said control circuit means; and a shift register means, connected to said word file memory and said control circuit means, for generating serial code signals.

18. An encoding device according to claim 17, wherein said control circuit means, further comprises:
- a programmable logic array circuit having a programmable timer for controlling the duration of preselected portions of said code signals and the duration of transmission of said voice message;
- a timer, connected to said programmable logic array circuit and said shift register means, for providing a time base thereof; and
- a switching means, connected to said transmitter means, said voice receiving means, said shift register and said programmable logic array circuit, for switching from the transmission by said transmitter means of said code signals to said voice messages and vice versa.

19. An encoding device, according to claim 15, wherein said selecting means comprises:
- a keyboard and keyboard controller; and
- a visual display device.

20. An encoding device, according to claim 19, wherein said control circuit means further comprises:
- processing means for generating the code signals to be transmitted and for controlling the duration of preselected portions of said code signals and the duration of transmission of said voice message;
- audio data select means, connected to said processing means, for generating an output indicating which one of said voice message and said code signals should be transmitted;
- audio data detection means, connected to said processing means and said transmitter means for generating an output indicating that one of said voice signal and said code signal should be transmitted; and
- switching means, connected to said processing means, said audio data select means, said voice receiving means and said transmitter means, for switching from the transmission by said transmitter means of said code signals to said voice messages and vice versa.

21. An encoding device, according to claim 16, wherein said control circuit means further comprises:
- processing means for generating the code signals to be transmitted and for controlling the duration of preselected portions of said code signals and the duration of transmission of said voice message;
- audio data select means, connected to said processing means, for generating an output indicating which one of said voice message and said code signals should be transmitted;
- audio data detection means, connected to said processing means and said transmitter means for generating an output indicating that one of said voice signal and said code signal should be transmitted; and
- switching means, connected to said processing means, said audio data select means, said voice receiving means and said transmitter means, for switching from the transmission by said transmitter means of said code signals to said voice messages and vice versa.

* * * * *